United States Patent
Klein et al.

(10) Patent No.: US 8,185,088 B2
(45) Date of Patent: May 22, 2012

(54) MOBILE DEVICE LEASING WITH CUSTOMIZED OPERATIONAL FEATURES

(75) Inventors: Robert S. Klein, Manchester, CT (US); Arthur R. Brisebois, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 286 days.

(21) Appl. No.: 12/576,426

(22) Filed: Oct. 9, 2009

(65) Prior Publication Data

US 2011/0086611 A1    Apr. 14, 2011

(51) Int. Cl.
*H04M 11/00* (2006.01)
(52) U.S. Cl. ......... 455/409; 455/406
(58) Field of Classification Search ........... 455/406–411
See application file for complete search history.

(56) References Cited

U.S. PATENT DOCUMENTS

| | | | | |
|---|---|---|---|---|
| 2003/0060199 | A1* | 3/2003 | Khalil et al. | 455/435 |
| 2003/0129974 | A1* | 7/2003 | Viitala | 455/414 |
| 2008/0139172 | A1* | 6/2008 | Gamel | 455/406 |
| 2009/0081996 | A1* | 3/2009 | Duggal et al. | 455/414.1 |
| 2009/0093232 | A1* | 4/2009 | Gupta et al. | 455/410 |
| 2010/0311468 | A1* | 12/2010 | Shi et al. | 455/558 |

OTHER PUBLICATIONS

Test Drive: Verizon Wireless Puts Customers in the Driver's Seat: 2 pgs.

* cited by examiner

*Primary Examiner* — Nick Corsaro
*Assistant Examiner* — Joel Ajayi

(57) ABSTRACT

System(s), device(s), and method(s) are provided to supply a device that accesses and utilizes resources in a wireless network under a lease agreement. A system generates service unit bank(s) that enable service utilization and provides a customized operational profile that enables custom configuration of service in the device. The device can receive lessee-specific operational profile(s) and lease agreement term(s), and can regulate a lease agreement. If the lease agreement expires, the device can lock at least a portion of the functionality of the device and provide an environment to renew the lease agreement. If the device is not returned, the system pursues various asset protection mechanism(s), such as assessment of recovery fees and tracking location of the device. Returned device is commissioned for a new lease. Synchronization of lessee-specific operational profiles amongst device and the system, or network external thereto, can be accomplished through a femtocell network or a macrocell network.

36 Claims, 22 Drawing Sheets

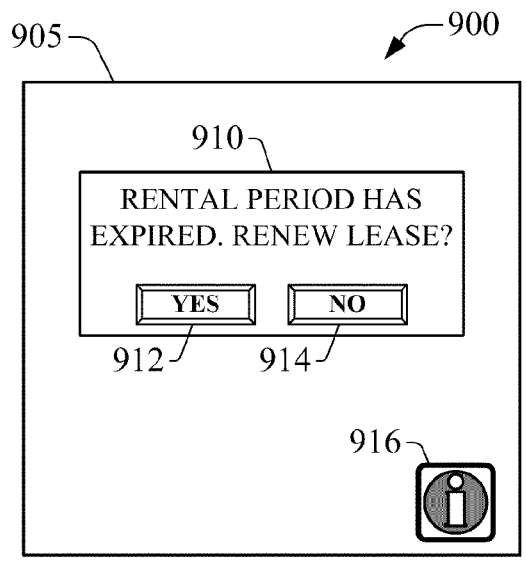
FIG. 9
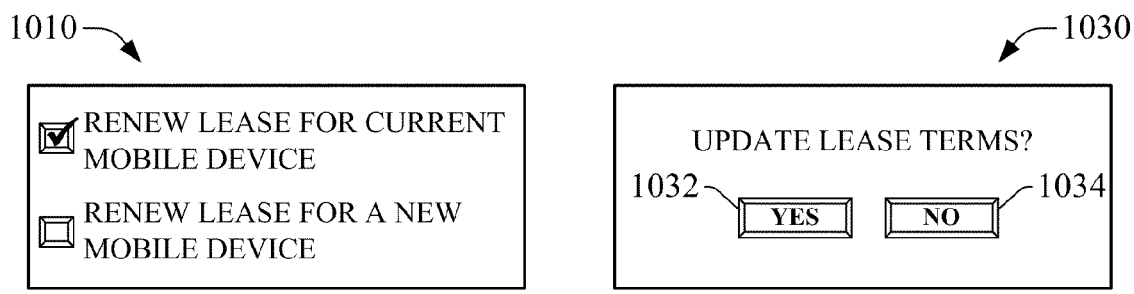
FIG. 10A           FIG. 10C
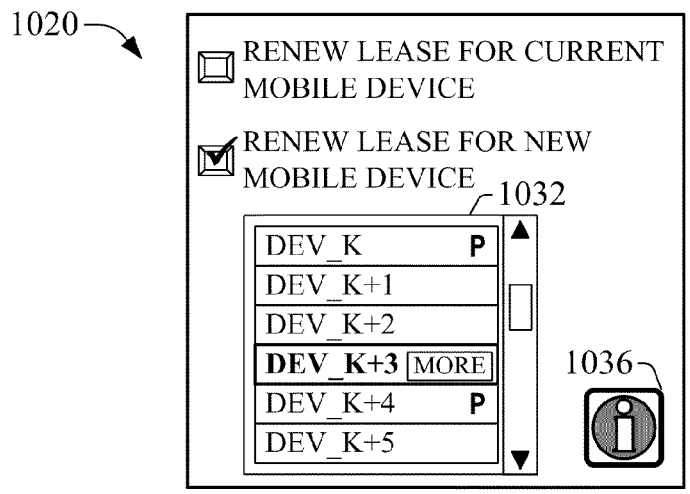
FIG. 10B

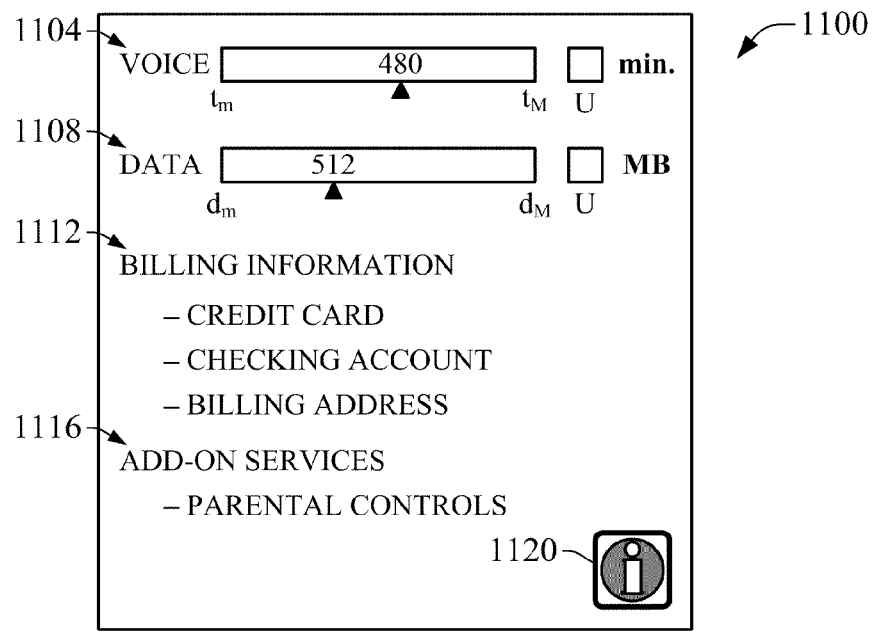
FIG. 11
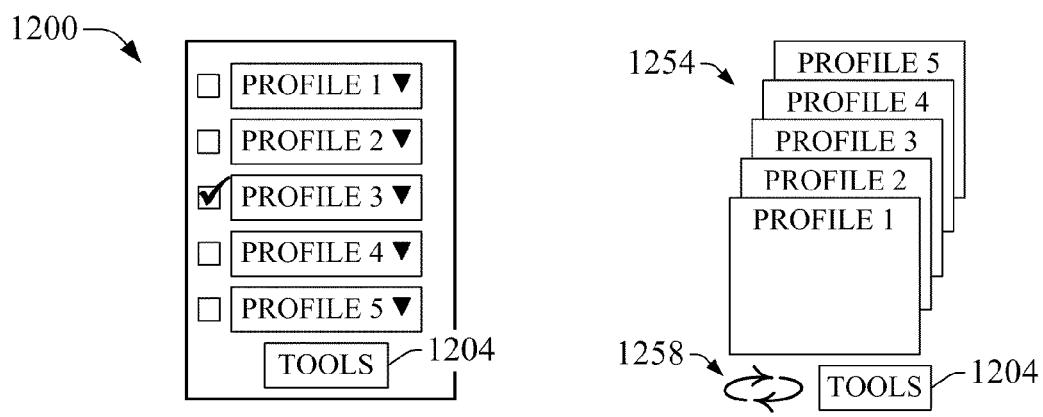
FIG. 12A  FIG. 12B
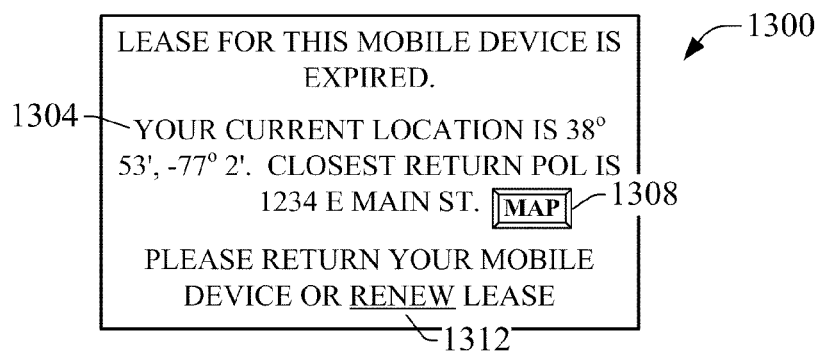
FIG. 13

MOBILE DEVICE LEASING WITH CUSTOMIZED OPERATIONAL FEATURES

TECHNICAL FIELD

The subject innovation relates to wireless communications and, more particularly, to supplying a mobile device under a lease agreement with utilization management and lessor's asset(s) protection.

BACKGROUND

As rapidly evolving multi-functional mobile devices such as smartphones become the dominant type of employed device in the wireless marketplace, both network operators and customers face similar difficult decisions. At the network operator end, a business determination is to be made as to whether cost of the user equipment is to be heavily subsidized under the expectation of recouping such cost over the term of a contracted service plan. At the customer end, an adoption threshold, or "fear of commitment," is to be overcome in order for the customer to spend $200-400 for a mobile device which they must contractually commit to exclusively for a substantial contract term. The issue of "fear of commitment" can lead inevitably to a certain set of subscribers selecting lower-cost mobile devices with lesser functional features and thus being under-served, with ensuing low perceived quality of service or dissatisfaction with wireless experience and, by association, with the network operator that offers the service. As a corollary of such under-served subscribers, the network operator develops to a limited extent the actual potential for revenue generation of such subscribers. Moreover, dissatisfaction or even sub-optimal satisfaction with a subscribed mobile device can increase potential for detrimental subscriber attrition. It should be appreciated that in a service scenario arising from fear of commitment, not only is the under-served subscriber locked into a fixed term contract, e.g., two-year contract, but the operator is locked into the potential, or lack thereof, of the subscribed mobile device for the contract term thus limiting revenue potential of the served subscriber. Conventional strategies implemented by network operators such as user equipment upgrades during a contract term are merely palliative solutions that fail to avert fear of commitment and associated subscriber attrition and underdeveloped revenue generation potential, and have detrimental impact on profitability to the network operator due to costs associated with user equipment subsidies prior to contract expiration.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the innovation. Its sole purpose is to present some concepts of the invention in a simplified form as a prelude to the more detailed description that is presented hereinafter.

The subject innovation provides system(s), device(s), and method(s) to supply a device that accesses and utilizes resources in a wireless network under a lease agreement. A system functionally coupled to an access network configures the lease agreement and provisions the device accordingly. As part of lease configuration, the system collects generates service unit bank(s) that enable service utilization and provides a customized operational profile that enables custom configuration of service in the device. The device can receive lessee-specific operational profile(s) and lease agreement term(s), and can regulate a lease agreement through monitoring of service unit bank(s). If the lease agreement expires, the device can lock at least a portion of the functionality of the device and provide an environment to renew the lease agreement. In the absence of renewal and if the device is not returned, the system pursues various asset protection mechanism(s), which includes assessment of recovery fees and tracking location of the device. Returned device is commissioned for a new lease agreement, wherein commissioning includes removal of data, call records, and applications utilized by previous lessee. Synchronization of lessee-specific operational profiles amongst device and the system, or network external to the system, can be accomplished at least in part through at least one of a femtocell network or a macrocell network. The lease agreement can be provided with leasing incentives or customized to a specific subscriber.

It should be appreciated that aspects, features, or advantages of the subject innovation are network and technology agnostic, and can be exploited in substantially any network, mobile or otherwise, and through any wireless telecommunication, or radio, technology. For example, Wi-Fi, Worldwide Interoperability for Microwave Access (WiMAX); IS-95; Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA), or LTE Advanced. Additionally, substantially all aspects of the subject innovation can include legacy telecommunication technologies.

It is noted that while various aspects, features, or advantages of the subject innovation are illustrated through femtocell access point(s) and associated femtocell network component(s), such aspects and features also can be exploited in other types of indoor-based access points (e.g., home-based access point(s), enterprise-based access point(s)) that provide wireless coverage through substantially any, or any, disparate telecommunication technologies such as, but not limited to, Wi-Fi (wireless fidelity) or picocell telecommunication.

To the accomplishment of the foregoing and related ends, the innovation, then, comprises the features hereinafter fully described. The following description and the annexed drawings set forth in detail certain illustrative aspects of the innovation. However, these aspects are indicative of but a few of the various ways in which the principles of the innovation may be employed. Other aspects, advantages and novel features of the innovation will become apparent from the following detailed description of the innovation when considered in conjunction with the drawings.

BRIEF DESCRIPTION OF DRAWINGS

FIG. 9 illustrates an example rendition of an indication to renew a lease in accordance with aspects described herein.

FIGS. 10A-10C presents example renditions of various prompts subsequent to election to renew a lease of a mobile device in accordance with aspects described herein.

FIG. 11 illustrates a rendition of a lease update environment in accordance with aspects described herein.

FIGS. 12A-12B present example renditions of environments for selection available operational profiles for a legacy lessee that rents a new mobile device.

FIG. 13 is an example rendition of an advisory notification to return a mobile device with an expired lease in accordance with aspects described herein.

DETAILED DESCRIPTION

Figure 1:
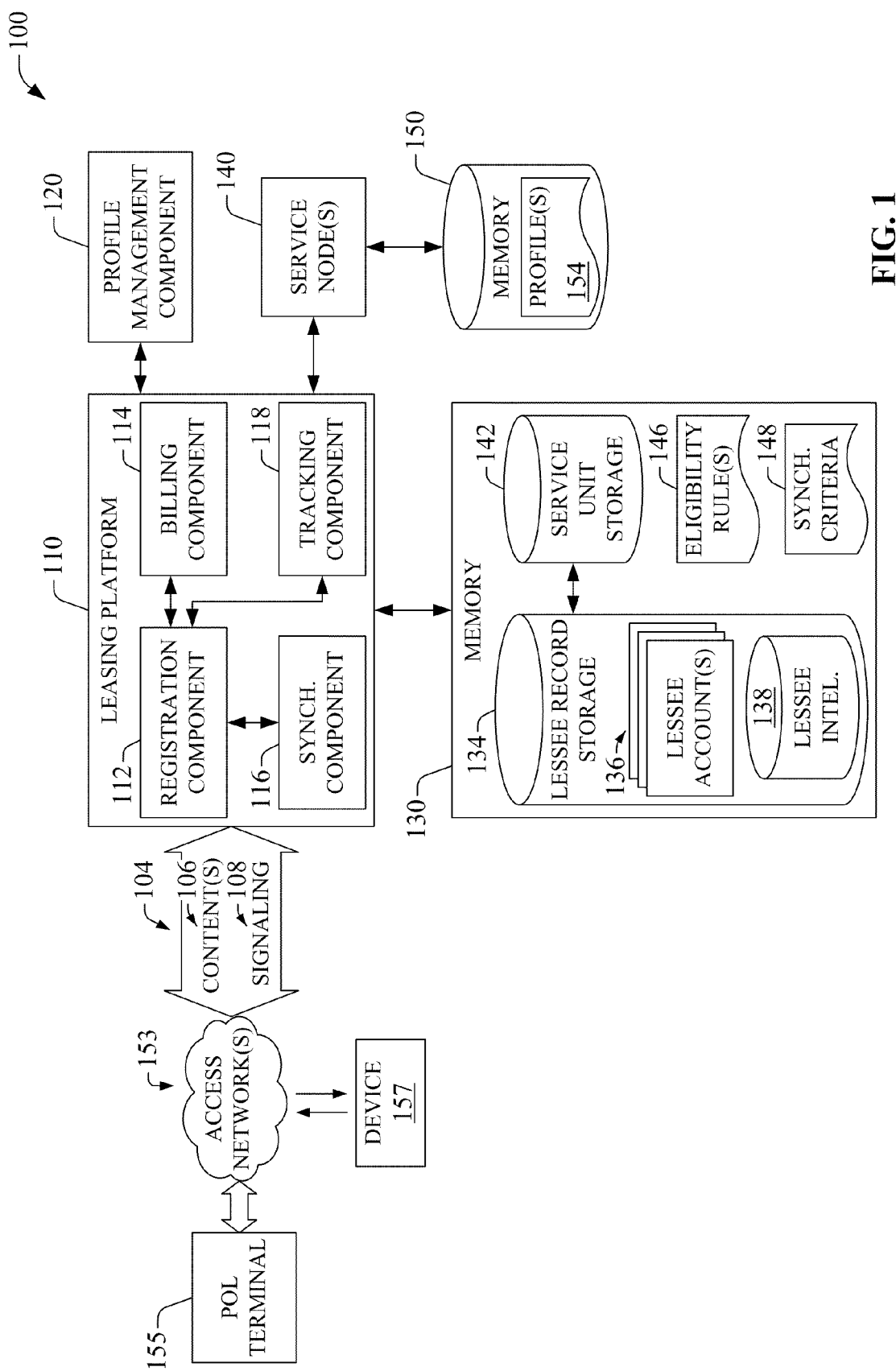
FIG. 1 illustrates a block diagram of an example system that enables provision of a mobile device through a lease, or rental, agreement according to aspects described herein.

The subject innovation is now described with reference to the drawings, wherein like reference numerals are used to refer to like elements throughout. In the following description, for purposes of explanation, numerous specific details are set forth in order to provide a thorough understanding of the present innovation. It may be evident, however, that the present innovation may be practiced without these specific details. In other instances, well-known structures and devices are shown in block diagram form in order to facilitate describing the present innovation.

As employed in this specification and annexed drawings, the terms "component," "system," "platform," "interface," "node," "coder," "decoder" and the like are intended to refer to a computer-related entity or an entity related to an operational apparatus with one or more specific functionalities, wherein the entity can be either hardware, a combination of hardware and software, software, or software in execution. One or more of such entities are also referred to as "functional elements." As an example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/ output (I/O) components as well as associated processor, application, or Application Programming Interface (API) components. While the foregoing examples are directed to aspects of a component, the exemplified aspects or features also apply to a system, platform, interface, node, coder, decoder, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point;" "base station," "Node B;" "evolved Node B (eNode B);" "home Node B (HNB)" or "home access point (HAP)," which include femtocell access point, picocell access point, Wi-Fi base station, etc.; and the like, are utilized interchangeably in the subject application, and refer to a wireless network component or apparatus that serves and receives data, control, voice, video, sound, gaming, or substantially any data-stream or signaling-stream from a set of subscriber stations. Data and signaling streams can be packetized or frame-based flows. It is noted that context in the subject specification generally distinguishes among a base station that provides outdoor wireless coverage and a home access point (e.g., femtocell AP) that provides indoor wireless coverage; explicit distinction between indoor-serving AP and outdoor-serving base station is made when context may be insufficient to distinguish the utilized terms.

Furthermore, the terms "user," "subscriber," "customer," "consumer," "prosumer," and the like are employed interchangeably throughout the subject specification, unless context warrants particular distinction(s) among the terms. The term "actor" can refer to a subscriber or a lessee of a network operator, or telecommunication carrier. It should be appreciated that such terms can refer to human entities or automated components supported through artificial intelligence (e.g., a capacity to make inference based on complex mathematical formalisms) which can provide simulated vision, sound recognition and so forth. When utilized herein, the term "prosumer" indicates one of the following contractions: professional-consumer and producer-consumer.

The term "intelligence" as utilized herein with respect to a network refers to substantially any, or any, information that characterizes a wireless network or non-mobile network such as for example, coverage area(s), operation marketplace(s), subscriber information, service offerings and associated promotional and advertising campaigns, commercial (e.g., sales, earnings, operational margins, costs) and non-commercial (e.g., community outreach, philanthropy . . . ) activities involving offered services or products, or the like. Similarly, when the term "intelligence" is applied to a lessee or subscriber, it refers to commercial and non-commercial information available for the subscriber.

As described in greater detail below, the subject innovation provides system(s), device(s), and method(s) that supply a device that accesses and utilizes resources in a wireless network under a lease agreement. A system functionally coupled to an access network configures the lease agreement and provisions the device accordingly. As part of lease configuration, the system collects generates service unit bank(s) that enable service utilization and provides a customized operational profile that enables custom configuration of service in the device. The device can receive lessee-specific operational profile(s) and lease agreement term(s), and can regulate a lease agreement through monitoring of service unit bank(s). If the lease agreement expires, the device can lock at least a portion of the functionality of the device and provide an environment to renew the lease agreement. In the absence of renewal and if the device is not returned, the system pursues various asset protection mechanism(s), which assessment of recovery fees and tracking location of the device. Returned device is commissioned for a new lease agreement, wherein commissioning includes removal of data, call records, and applications utilized by previous lessee. Synchronization of lessee-specific operational profiles amongst device and the system, or network external to the system, can be accomplished at least in part through at least one of a femtocell network or a macrocell network. The lease agreement can be provided with leasing incentives or customized to a specific subscriber.

Various aspects or features of the subject innovation are illustrated with reference to a leased mobile device, which can include refurbished or returned-after-purchase devices, and novelty devices that support new capabilities or services. Mobile devices can include multi-functional, programmable smartphones (e.g., Apple® iPhone, G1 running on Android operating system, BlackBerry® products . . . ), or portable computers (e.g., notebooks) with built-in communication platforms for telecommunication, such as third-generation (3G) or fourth-generation (4G) modems and other suitable circuitry. It is noted, however, that most any or any device that accesses and utilizes resources on a wireless network can be provisioned and operated under a lease agreement in accordance with aspects of the subject innovation. As an example, copier/scanner or fax machine with wireless communication functionality can be provided under lease agreement; customized operational features included in operational profile associated with such device can include contact list(s) of users of the copier/scanner or fax, preferences for toner or paper size, etc. As another example, industrial devices that can execute customized operations also can be provided under a lease agreement in accordance with aspects described herein.

Aspects and features of the subject innovation provides various advantages with respect to conventional contracted wireless service subscription, such as the following. From the lessee perspective.—(i) Ability to test a mobile device before making a significant monetary purchase; thus, fear of commitment is substantially averted. (ii) Ability to lease a device from a competing telecommunication carrier to evaluate network reliability compared to a current network operator, while preserving substantially all custom features retained in operation profile(s) retained by lessee. (iii) Capacity to provide a leased mobile device as a courtesy for a predetermined period of time. (iv) Ability to access a device with capabilities beyond those of lessee's current device for a specific period of time, e.g., lessee travels on domestic vacation and desires or needs immediate access to personal mail account and configured calendar. (v) Substantive satisfaction of technophile segment of prospective lessees, to whom access to latest technology is deemed a necessity; such prospective lessee have access to a set of novelty devices on a temporary basis without long-term commitment; fear of commitment is thus circumvented. (vi) Transferability of mobile number provisioned to leased device during the term of a lease and recurrent renewals; a disparate mobile number also can be forwarded to leased device. (vi) Retention and automatic synchronization of lessee's custom operational profile(s); substantive reduction in adoption threshold for segment of prospective lessee with limited literacy related to mobile devices.

From the network operator perspective.—(1) Unique service offering compared to competing telecommunication carrier, with ensuing increased operator reputation. (2) Upsell on higher feature content devices by lessees being able to test before purchase, with resulting increase in average revenue per user/unit (ARPU.) (3) Opportunity to market to subscribers of competing network operators with lure of enhanced network reliability or unique device, with increased gross customer acquisitions. (4) Flexibility to offer device rentals as a courtesy of recurring gift, which can drive gross subscriber acquisitions. (5) Retention opportunity for subscribers unsatisfied with currently subscribed mobile device and either not yet out of current contract or out of contract and procuring alternative network operators; thus, subscriber attrition can be reduced. (6) Increased accessory sales from lessees changing/trailing user equipment with increased frequency; thus, increased revenue. (7) Retention and automatic synchronization of custom device user profiles, or operational profiles, can differentiate various network operators offering similar services. Increased configuration versatility can attract wireless customers, who are generally more attracted, and likely loyal to, the network operator that delivers most simplified and user-friendly device rental experience. Leasing program described herein can promote real loyalty in a fashion that fixed-term contracts fail to accomplish. Lessee customized operational also can simplify subscriber adoption of novel product(s) or service(s), which increases revenue potential for network operator, rather than having subscribers spending time to re-configure new devices for old services.

FIG. 1 illustrates a block diagram of an example system 100 that enables provision of a mobile device through a lease, or rental, agreement according to aspects described herein. Example system 100 can be part of or functionally coupled to a network, mobile or otherwise, operated by a telecommunication carrier that implement, e.g., conceives, plans, commissions, or promotes, a mobile device leasing program. A prospective lessee can be a potential subscriber or an existing subscriber of such telecommunication carrier, or a customer of a competing network operator.

Leasing platform 110 processes a request to lease a mobile device (e.g., 157) and grants or declines a lease agreement. For a granted lease agreement, or rental, leasing platform 110 can configure the lease agreement and provision the leased mobile device. In addition, leasing platform 110 protects lessor's asset(s) through various mechanism(s), which can include financial safeguards and tracking of leased device location. Leasing platform 110 also facilitates or enables revenue retention and generation. Term(s) of a lease agreement and lessee information, such as a lessee account, lessee intelligence, or leased service units, can be retained in memory 130.

In the subject innovation, information or payload within signaling 108, and directive(s), request(s), or indication(s) conveyed therein, can be embodied, for example, in one or more reserved bits in a packet header, a light-payload (e.g., of the order of 1 byte) data packet, a predetermined multi-bit word conveyed in a control channel, a light-payload file (e.g., a cookie), an email communication, an instant message, or the like. In addition, request(s), as well as content(s) 106, described herein can be delivered in accordance with various protocols such as file transfer protocol (FTP), secure shell FTP (SFTP), FTP over secure socket layer (FTPS), short message service (SMS) protocol, multimedia messaging service (MMS) protocol, unstructured supplementary service data (USSD) standard, simple network management protocol (SNMP), or the like.

To process a request to lease a mobile device, leasing platform 110 includes a registration component 112 that receives the request, through signaling 108 via link(s) 104. In response to the request, registration component 112 can collect information from the prospective lessee; the information can be retained within lessee intelligence 138. To effect such collection, registration component 112 can deliver request(s) for specific information via signaling 108, and receive associated information as part of payload of signaling 108 or content(s) 106. In an aspect, the collected information can include at least one of selected model of mobile device to lease; selected volume of service units, e.g., airtime or data; billing information, which includes credit card records, banking account data such as checking account or saving account information; commercial identifier(s) such as, but not limited to, social security number, tax identification number, or the like; or other information conventionally requested in a commercial transaction. Moreover, collected information can include data on wireless services retained by the applicant; the services can include macrocellular wireless service, femtocell wireless service, high-speed internet, internet protocol television (IPTV), or the like, and can be provided by the network operator, or telecommunications carrier, that administers the lease of mobile device(s) or by a disparate network operator.

Based at least in part on the collected information, registration component 112 can classify the prospective lessee through application of a set of eligibility rules that evaluate the prospective lessee's eligibility to lease the mobile device. Eligibility rules are configurable and can be issued by a network operator, and can be retained in memory element 142. In an aspect, eligibility rules can include at least one of (i) cutoff thresholds for ratings of legacy applicants, e.g., applicants that previously engaged in leasing of a mobile device; (ii) merit or demerit points for subscription or lack thereof to mobile and non-mobile services provided by the telecommunications carrier that manages leasing of mobile device(s) or other network operators; (iii) asset risk classification of leased mobile device as determined at least in part through costs of purchase of mobile device from manufactures; (iv) availability of financial instruments directed to securing cost of leased mobile device, e.g., applicant that fails to provide a valid credit card can be barred, temporarily or permanently, from leasing a mobile device; or the like. It is noted that eligibility rules employed in the assessment of an applicant can avoid reliance on conventional creditworthiness ratings to establish applicant's eligibility or non-eligibility.

If the prospective lessee is ineligible, registration component 112 declines the request to lease the mobile device and implements a retention protocol, registration component 112 can deliver a notification or report that conveys one or more reasons the request is declined and corrective action(s) that may render the prospective lessee eligible. The notification or report can be delivered as part of content(s) 106. In addition or in the alternative, registration component 112 can supply a recommendation for a set of one or more mobile devices that the applicant is eligible to rent. Moreover, registration component 112 can deliver, via content(s) 106, promotional material that recommends a subscription to a non-lease wireless service program that qualifies for participation on leasing plan(s) of mobile devices.

Conversely, if the prospective lessee is classified as eligible, registration component 112 assigns a mobile number to the mobile device that is to be operated through a lease agreement, configures a lease agreement, and conveys an indication to provision the mobile device. The assigned mobile number is to be used by lessee for the duration of the rental period. As part of configuration of the lease agreement, registration component 112 generates a lessee account, retained in memory element 136. To increase storage efficiency, a lessee account associated with a subscriber of network operator that manages leasing program can be retained as a symbolic link to a storage location within a subscriber database (not shown) that can be part of mobile or non-mobile network (s) or the network operator. As another part of configuration of the lease agreement, registration component 112 creates one or more service unit "banks" or "buckets," retained in service unit storage 142; unit for voice service can be minute or other suitable unit, while unit for data can be megabyte (MB) or the like. In accordance with a lease agreement, lessee can consume voice or data service(s) if service unit banks contain available unit(s), or throughout an agreed lease period.

To further configuration of the lease agreement, registration component 112 can request additional information such as at least a portion of an operational profile of a non-leased mobile device available to the prospective lessee. In the absence of such additional information, registration component 112, via at least in part profile management component 120, can compose an initial operational profile that configures, at least in part, one or more services to be provided through the mobile device. The composed operational profile can be customized for the lessee based at least in part on at least one of leased mobile device and gathered information. As an alternative or in addition to composition of an operational profile, registration component 112 can direct synchronization component 116 to poll a set of service node(s) 140 to extract a set of one or more operational profiles, e.g., profile (s) 154, from memory 150 accessible to one or more service node(s) within the set. In an aspect, the service node(s) 140 exploits one or more of the extracted operational profiles to provide a service to the lessee, the service need not be supplied through a wireless network. The service node(s) 140 can be part of a network, mobile or otherwise, managed by the telecommunications carrier that supplies the leasing program or administered by an external operator; for instance, service node(s) 140 can include operation and maintenance server(s) or equipment; customer support server(s); network administration server(s); billing server(s); email server(s); application server(s); utility server(s); or the like. Operational profiles that are available to registration component 112, either composed are retained within the generated lessee account in lessee record storage 134, and delivered to the leased mobile device as part of content(s) 106. Delivery of operational profile can automate, at least in part, configuration of the leased mobile device; thus, simplifying leased mobile device configuration process through mitigation of lessee intervention.

With respect to the indication to provision the mobile device, such indication can include the assigned mobile number, and can be conveyed to a wireless service network platform (which can be part of access network(s) 153), or component(s) therein, in order to accomplish at least one of the following. Commitment of the mobile number assigned to the mobile device; or initiation one or more services that enable operation of the mobile device—e.g., call session establishment, authorization, authentication and accounting (AAA) services, access to add-on service(s) such as wireless IPTV broadcast(s), satellite-based radio content, web-browsing parental controls, etc.

Registration component 112 also can convey collected billing information of an eligible lessee to billing component 114, which can assess lease charges and broker a financial hold on one or more of the lessee's financial instruments, e.g., credit card, disclosed as part of the billing information. Billing component 114 can broker the financial hold with one or more financial institutions that manage such financial instruments. The financial hold provides asset protection since it is directed to guarantee monetary resources to cover costs of replacement of the leased mobile device, and can be placed at the time a lease agreement is acknowledged by the prospective lessee, and removed when the mobile device is returned undamaged and operational.

For a current lease, billing component 114 can monitor usage information received from at least one of a leased mobile device or a network management component, e.g., an Authorization, Authentication and Accounting (AAA) server or a home location register (HLR). Based at least in part on the monitored information, billing component 114 can update service unit bank(s) retained in service unit storage 142 and determine at least one of consumption of leased service units or expiration of lease terms. If usage information is received from both the leased device and the network management component, billing component 114 can carry out a reconciliation protocol to ensure integrity of reported usage. Additionally, if a lease is renewed, billing component 114 can implement rollover of service units unused throughout a rental period, wherein a service unit bank for a new lease is updated to include service units not used in a previously completed rental period. In an aspect, voice and data service units can be rolled over to a new lease period based at least in part on at least one of lessee rating, retained in lessee account within set 136, or lessee intelligence 138. Rollover of unused service units can be implemented on a promotional basis, as an incentive to mitigate lessee attrition and retain revenue. Generally, in one or more alternative or additional embodiments of example system 100, billing component 114 can update service unit storage in accordance with a promotional campaign directed to a specific lessee or segment of lessees.

With regard to asset protection, to limit exposure of the network operator to loss of user equipment (UE), or physical asset, tracking component 118 can poll leased mobile device current location or substantially current location in case the it is not returned after a predetermined period after lease term(s) expire. Thus, the network operator can actively pursue recovery of user equipment, for example, through dispatch of agents of a collection agency or law enforcement to an estimated location of the mobile device. In an aspect, registration component 112 can direct tracking component 118 to poll the location of mobile device, which can be accomplished through delivery of a request to generate a location estimate at the mobile device and transmit the location estimate to tracking component 118. The request can be conveyed as part of signaling 108, whereas the location estimate can be received as part of content(s) 106. For leased mobile device with global positioning system (GPS) navigation functionality, the leased mobile device can generate an estimate of the current or substantially current location based at least in part on GPS navigation data.

In scenarios in which GPS-based location fix is unavailable, a service wireless network, via, for example, a femtocell AP or a macrocell Node B, can produce the estimate of the current of substantially current location of leased mobile device. In such scenarios, tracking component 118 can deliver a request for a location estimate to a component within the service network, the component can either produce the estimate or operate as a proxy for a component that can generate the estimate. In an aspect, the macrocell Node B (not shown) can generate the estimate through, at least in part, time-of-flight (TOF) measurements, e.g., measurements of round trip time (RTT), DL or UL time of arrival (TOA), or DL or DL time difference of arrival (TDOA). In another aspect, estimate of the current or substantially current location of the leasing mobile device with pending return can be estimated through location of a femtocell AP to which the leased mobile device is attached. The location of the femtocell AP can be collected, for example, at the time of provisioning such AP for service, and is generally available through at least one of a subscriber database (e.g., a memory linked to a home subscriber server (HSS)), a provisioning database, or an external location server, e.g., serving mobile location center (SMLC). Such location server can embody one service node(s) 140.

It is noted that an alternative to the recovery of UE indicated supra is to direct the leased mobile device to render a notification of its estimated location and a request to return the UE to a predetermined retail location, leasing location, or drop-off box; registration component 112 can deliver a directive to render the foregoing notification and request. It should be appreciated that the drop-off box can be located in the predetermined retail location or leasing location, both of which can be, e.g., a store owned by the network operator or an affiliate. It should be further appreciated that network operator that manages leasing program can provide retail or leasing locations with protocol(s) (e.g., stoking procedures, delivery procedures to supply warehouse, or the like) to return leased mobile devices. The directive also can request to render an offer to renew the expired lease.

In an aspect of the subject innovation, tracking component 118 also can retain, as part of lessee intelligence 138, at least one of call session records or at least a portion of call session traffic for compliance with law enforcement regulation(s), such as the Communications Assistance for Law Enforcement Act (CALEA). In one or more embodiments, to improve storage efficiency tracking component 118 can compress the stored call session records or traffic through various conventional mechanisms.

Lessee intelligence 138 and lessee account(s) 136, and information therein, can be preserved according to a retention protocol (not shown) which dictates, at least in part, a time span to maintain such information in memory 130 subsequent to termination of a lease prior to at least a portion of the information being flushed, or compressed and stored as backup. The retention protocol (not shown) can be stored in memory 130 as code instructions (not shown); in an aspect, registration component 112 can carry out the retention protocol.

Mobile devices that are returned to a point of lease (e.g., POL terminal 155), such as a retail location, a leasing location, or a drop-off box in a vending machine or kiosk that enables leasing of mobile devices, can be scheduled for commissioning for new lease. Such commissioning can include, for example, removal of at least one of all lessee data, call records, or application(s) that the lessee may have downloaded. In addition, the commissioning can include any necessary repairs and testing in order to provide the mobile device for further lease(s) in adequate, or optimal or nearly optimal, condition. Mobile devices available for lease in the point of lease (e.g., POL terminal 155) can be audited periodically, e.g., by a network operator or a representative thereof, to ensure the mobile devices are in optimal or nearly optimal conditions. In an aspect, registration component 112 can receive, as part of signaling 108, an indication the mobile device has been returned, and can schedule the mobile device for commissioning for new lease. In case the mobile device is returned to a retail location, the commissioning can be implemented on location. Alternatively, a mobile device returned in a drop-off box can be picked up by a network operator representative, e.g., field technician, returned to a point of lease, and then commissioned for lease. It is noted that a rental device that is pseudo-stationary can be picked up by a network operator representative upon expiration of lease term(s) and returned to a point of lease to be scheduled for commissioning for lease or to be commissioned for lease.

The following example scenario illustrates an advantage of provision of a mobile device under lease agreement. A network operator offers a mobile device (e.g., a 3G Apple® iPhone) with 1000 min./month and unlimited data usage for $90 per month with a purchase price of the device of $200 with a two year contract. Assuming the mobile device actual cost to the network operator is $500 to buy the mobile device from its manufacturer, throughout the course of the 24-month contract (or device "lifetime"), the mobile device yields the network operator a net revenue of 24·$90+$200-$500=$1, 860. If the same device is leased in accordance with aspects described herein at a price point of $29.99 per week (wk.), in an rental interval of just 84 weeks out of a two year period, the device can produce 84·$29.99-$500=$2,020 in revenue. It should be appreciated that the 84-week rental interval can involve disparate lessees that rent the mobile device in disjointed periods. The lease program revenue for the mobile device is thus nearly 9% more than the $1,860 in revenue yielded in the conventionally offered, device-subsidized two-year contract. In addition, refurbished or returned devices can be used to stock the rental pool of devices, which can further increase the revenue yield by leasing a device. For instance, if cost to the network operator of a refurbished or returned device is $200 instead of $500, then the net revenue generated through rental over 84 weeks within a two-year period is $2,320; 25% in excess the revenue of the 2 year contract example.

In addition to increased revenue potential for the network operator that implements leasing program with respect to a normal handset subsidy and fixed term (e.g., 2 year) contract, a customer who leases device(s) frequently or on a regular basis benefits from the flexibility of rental program for a relatively modest cost difference with respect to conventional handset purchase and monthly contract pricing. For instance, while in the foregoing two-year contracted plan out of pocket cost to a subscriber can be 24·$90+$200=$2,360, if the subscriber rented the same device at $29.99/wk, lease cost in a two-year interval would be 104·$29.99=$3,119. Thus, during a rental period, for example, to compare a set of specific devices, the subscriber pays a modest additional ($3,119-$2,360)/104=$7.30/wk. relative to the two-year contract price.

The lease platform described herein also allows a network operator to control usage and mitigate exposure to excessive usage on a leased mobile device for a rental period, while providing a lessee with a usage opportunity comparable to a subscriber in a two-year contract. For example, the network operator may offer 250 min/wk and one-quarter of the typical data usage for the specific leased mobile device.

In one or more embodiments, example system 100 can include one or more processors (not shown) which can be configured to provide, or that provide, at least in part, the described functionality of the various components described herein. To provide such functionality, the processor(s) (not shown) can exploit a bus, which can be embodied in at least one of a memory bus, a system bus, or an address bus, or a message bus, for data or any other information exchange conduit, protocol, or mechanism among disclosed memory (ies) or component(s) or subcomponents. Processor(s) (not shown) can execute code instructions (not shown) stored in a memory, e.g., 130, or alternative or additional memory components or elements therein, to provide the described functionality of example system 100 and various components thereof.

In further embodiment(s), leasing platform 110 can be embodied in a server(s) which includes at least one of one or more processors; a system bus, a memory bus, or message bus; and one or more memories, volatile or otherwise, and can be functionally connected to one or more component(s) described in example system 100 or other system(s) described herein. In such embodiment(s), various components that comprise leasing platform 110 can resides within the one or more memories in the server(s), as one or more sets of code instructions which implement the various components functionality when executed by the one or more processor in the server. Alternatively or additionally, in other embodiment(s), disparate components can be embodied in a plurality of servers, with respective processor(s), memories, and buses. Connectivity among servers in the plurality can occur through one or more conventional bus architectures. Server(s) within the plurality can execute the one or more component embodied thereby, e.g., through the at least one or more processor therein, to provide at least in part the functionality of component(s) of example system 100.

Figure 2:
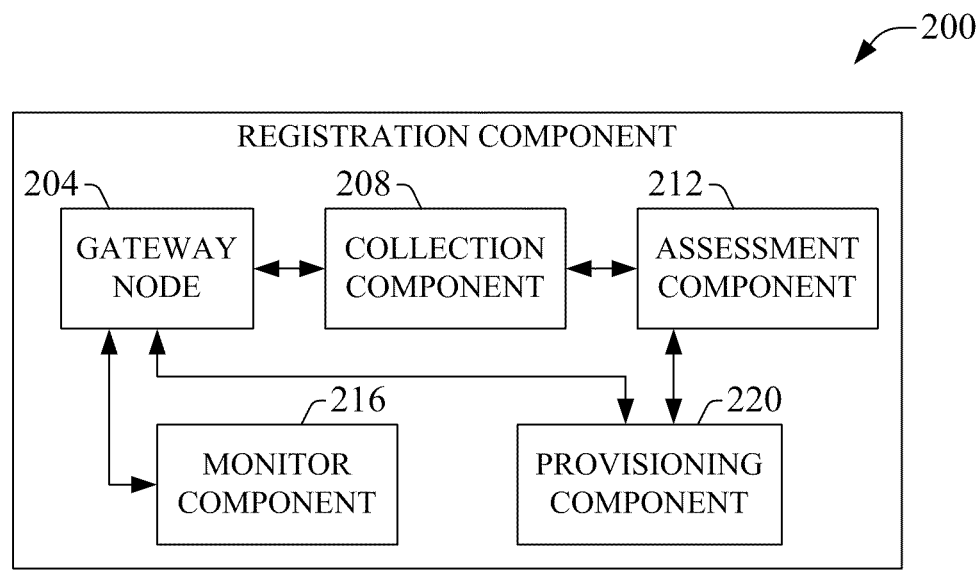
FIG. 2 illustrates an example embodiment of a registration component that can be part of a leasing platform in accordance with features of the subject innovation.

FIG. 2 illustrates an example embodiment 200 of a registration component 112 that can be part of a leasing platform in accordance with features of the subject innovation. The various components in embodiment 200 can facilitate or enable the foregoing functionality of registration component 112. In an aspect, gateway node 204 can deliver content(s) 106 as well as signaling 108. In addition, gateway node 204 relays such information to other component(s) within registration component 112. Collection component 208 can deliver directive(s) and response(s), via gateway node 204, to a prospective lessee, which communicates with leasing platform 110 though access network 153, which can be mobile or otherwise. Collected information can be relayed to assessment component 212 which can apply eligibility rules, retained in memory element 146, to received information and determined whether the prospective lessee is eligible for leasing mobile device 157. Assessment component 216 can supply outcome of assessment and at least a portion of collected leasing information to provisioning component 220, which can create service unit data bank(s), assign a mobile phone number to leased device, and signal billing component 114 to charge a financial instrument as identified in at least a part of collected leasing information. In addition, provisioning component 220 can deliver a provisioning request to one or more network management components of wireless network that can serve the leased device. Monitor component 216 operates as described supra.

Figure 3:
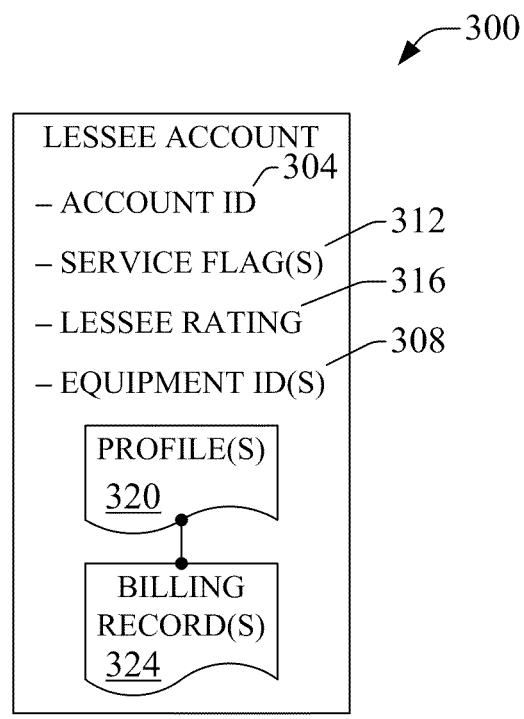
FIG. 3 illustrates an example embodiment of a lessee account in accordance with aspects of the subject innovation.

FIG. 3 illustrates example information recorded in a lessee account 300, which is an element of set 136. The information includes the following. (i) Account identification (ID) 304, which uniquely catalogs the account. Account ID 304 can be an alphanumeric attribute or code, wherein the attribute of code can identify a network operator marketplace or information related thereof such as, but not limited to, customer segment; service segment, e.g., business, consumer, and associated classifications such as "premium," "regular;" coverage segment, for example, radio technology available for communication in a marketplace; economic indicators; or the like.

The network operator, or telecommunication carrier, can dictate coding of account ID 304. Such coding can facilitate or enable indexing of lessee account(s) set 136.

(ii) Service flag(s) 312 indicate available services available to a lessee either through the network operator that administers the leasing program or a competing network operator. For example, a service flag can be a logic variable linked to a predetermined service such as femtocell service, macrocell service, high-speed internet service, IPTV, cable content, or the like; for instance, a femtocell subscriber can have a variable "femto service" set to "True." Additionally or alternatively, service flag(s) 312 can be a multi-bit word(s) with a set of J bits, e.g., 4 bits, employed to code an available service, with the least significant bit employed to identify whether the network operator or a competing telecommunication carrier supplies the service; J is a natural number. As indicated supra, registration component 112 collects information on service (s) available to a lessee linked to lessee account 300.

(iii) Lessee rating 316 conveys at least one of a commercial or operational standing as appraised by the network operator that manages the leasing program. Commercial standing can reveal actual or potential revenue associated with the lessee account, whereas operational standing can rate network utilization and imposed limitations thereof. For instance lessee rating 316 can identify a low-revenue consumer subscriber that has been hotlined or suspended due to a late return of leased mobile device. Lessee rating 316 is time-dependent and can be updated by the network operator, through, e.g., leasing platform 110, at predetermined times throughout a lease. In an aspect, registration component 112 can determine lessee rating 316 based at least in part on lessee intelligence 138.

(iv) Equipment ID(s) 308 labels one or more leased mobile devices and can be one of international mobile subscriber identity (IMSI), a user identity module identifier (UIMID), an international mobile equipment identifier (IMEI), a mobile identification number (MIN), a Telecommunications Industry Association (TIA) electronic serial number (ESN), a multi-bit identification number such as mobile equipment ID (MEID), or the like. For each equipment ID in lessee account 300, one or more operational profiles in can be retained in profile(s) 320.

(v) An operational profile in profile(s) 320 can include setting(s) that facilitate or enable operation of the leased mobile device; setting(s) include at least one of navigation shortcuts, hyperlinks, address book(s), web-browsing bookmarks or favorites, ringtones, email profiles, home screen photos; security credentials such as Wi-Fi logins, banking passwords, logins to credit reporting services, social networking sites logins, or the like; etc. Such setting(s) generally can change as a lessee becomes familiar with capabilities of a leased mobile device and serving network, and the end user's interests evolve. Operational profiles can be configured for various mobile devices linked to a single lessee; e.g., an operational profile for a personal mobile device and an operational profile for a business-related mobile device.

Profile(s) 320 can be configured at various stages of a lease. If a lease is initiated, a profile can be configured by a lessee and delivered to registration component 112 via a POL terminal 155, e.g., through a user interface therein, that allows leasing a mobile device. The user interface (not shown) enables a prospective lessee to convey substantially any leasing information. In an aspect, POL terminal 155 can be embodied in a vending machine, which through the user interface, which can be embodied in a touch-screen, can guide a prospective lessee through the rental process and collect payment or billing information. If the prospective lessee is deemed eligible, POL terminal 155 can dispense the leased mobile device. In an aspect, POL terminal 155 (e.g., a vending machine) can prompt the prospective lessee, via the user interface therein, to accept operational or physical condition(s) (e.g., level of wear and tear) of the dispensed leased mobile device. If operational or physical condition(s) are unacceptable to prospective lessee, POL terminal 155 can receive an indication to such end through the user interface in POL terminal 155, and prompt the prospective lessee to return the unacceptable mobile device, which is tagged as "on hold." POL terminal 155, or a processor therein, can report on-hold mobile devices to convey such devices require repair(s) or replacement. To mitigate fraud, and prevent a large number of mobile devices available for lease to be tagged as "on hold," a prospective lessee can be allowed a finite, small number of rejections (e.g., two or three rejections).

In another aspect, an accepted mobile device can attach to an access point (not shown) associated with the POL terminal 155 (e.g., a vending machine) to enable configuration of at least a portion of a lease agreement. Configuration of at least one or more features of a lease agreement, such as leased service units for voice or data or operation profile(s), can be triggered by the access point, which can be a femtocell AP deployed in the POL terminal, The AP can direct the mobile device to execute an application that allows configuration of features of a lease agreement. To at least that end, the AP can deliver an SMS communication or MMS communication towards the mobile device to cause the configuration application to be executed. Execution of the configuration application can render a configuration environment, e.g., one or more user interfaces that allow entry of information related to a lease agreement. Received information can be delivered to the access point, which can relay the information to leasing platform 110. It should be appreciated that, as part of lease configuration through the executed application, the mobile device can receive additional instructions to complete lease process of the mobile device. An advantage of such lease configuration at the accepted mobile device is that it reduces the time a prospective lessee interacts with POL terminal 155 or component(s) therein.

Upon return of the mobile device, POL 155 (e.g., the vending machine), or a processor (not shown) therein, can signal, via access network(s) 153, that the device has been returned and registration component 112 can schedule the device to be commissioned for next lease. Alternatively or additionally, if synchronization component 116 receives an indication a network-based update has been performed in a service consumed by a leased mobile device, synchronization component 116 can signal profile management component 120 to update appropriate operational profile retained within lessee record storage 134. As indicated supra, the service (e.g., email messaging) can be provided through a serving network or an external network operationally coupled thereto through, for example, middleware architecture.

(vi) Billing record(s) 324 encompass data on one or more financial instruments that cover expenses incurred with a leasing agreement and secure a leased mobile device against loss or damage. The financial instrument(s) can include at least one of credit card or banking account. However, other financial instrument(s) can be employed such as a revolving charging account associated with service(s) subscribed with the network operator that administers the leasing program, particularly for subscribers that lease a device. Additionally, billing record(s) 324 are associated with profile(s) 320. The association is represented with a double-headed segment and can be a one-to-one or a one-to-many relationship. Such association can facilitate or enable, at least in part, identification of available profile(s) for a lessee and synchronization of the profile(s) with a leased mobile device. In an illustrative scenario, for a legacy lessee (e.g., a lessee that has rented a mobile device in the past) that has a one-to-many relationship amongst a credit card employed in lease transaction and device user profiles, registration component 112 can request the lessee to choose an available device user profile.

Figure 4A:
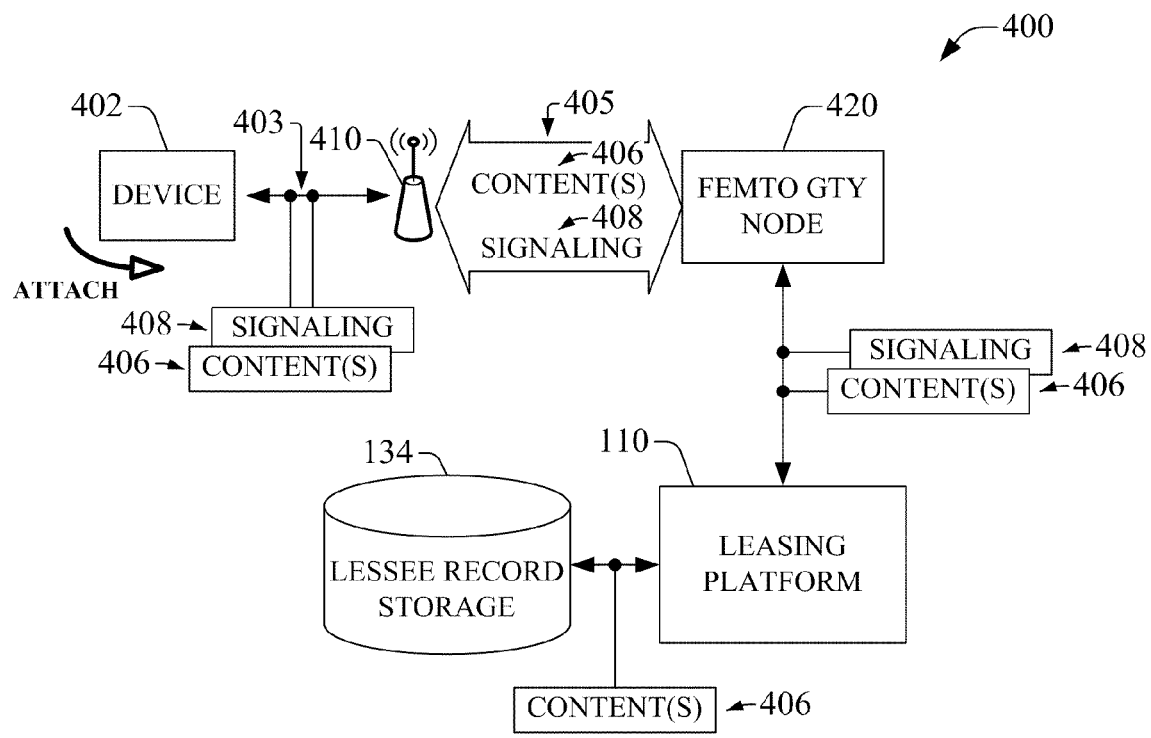
FIGS. 4A-4B display block diagrams of example systems to synchronize contents amongst a leased mobile device and a leasing platform in accordance with aspects described herein.
Figure 4B:
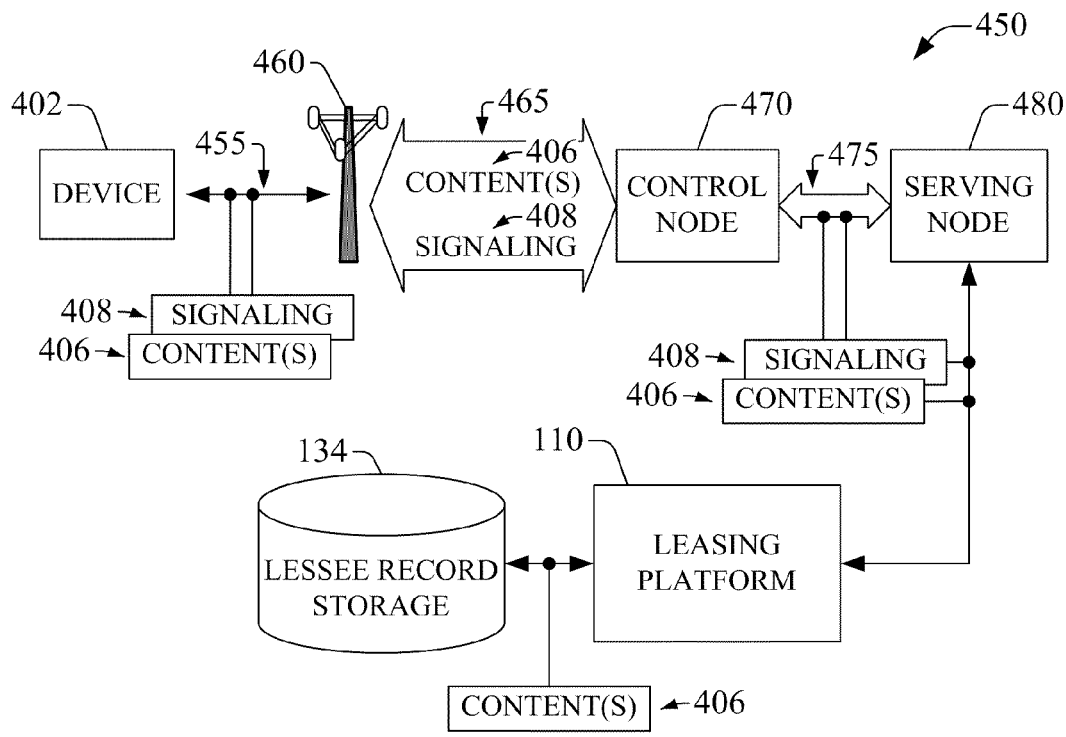

FIGS. 4A-4B display block diagrams of example systems 400 and 450, respectively, to synchronize contents amongst a leased mobile device and a leasing platform in accordance with aspects described herein. Example system 200 enables synchronization through a femtocell network in accordance with aspects described herein.

When a leased mobile device 402 enters a coverage area served through a femtocell AP, the leased mobile device 402 attempts to attach to the femtocell AP 410 through transmission and reception of attachment signaling. The signaling, which is part of signaling 408, is effected via wireless link(s) 403 (e.g., downlink (DL) and uplink (UL)) within the coverage area; in an aspect, in UMTS-based femtocell technology, the attachment signaling can include a Location Area Update (LAU) and/or Routing Area Update (RAU). At least a portion of the attachment signaling can be processed within femtocell AP 410, e.g., at a radio control node (not shown), to determine whether leased mobile device 402 is allowed femtocell service through femtocell AP 410. Alternatively or additionally, attachment signaling is processed at femto gateway (GTY) node(s) 420, which are part of a femtocell network platform that enables femtocell service. Successful attachment (indicated with arrow labeled "Attach") to femtocell AP 410 allows synchronization of an operational profile retained within lessee record storage 134.

Synchronization includes download of the operational profile as part of content(s) 406, and can be part of initial configuration of leased mobile device 402 for a new lease. Moreover, the changes also can originate at the network level, due, for example, to updates to service(s) consumed via leased mobile device 402. In an aspect, to effect the download, leasing platform 110, via synchronization component 116, can retrieve an available operational profile for lessee of mobile device 402 and convey it to femto gateway node(s) 420 as part of content(s) 406. Femto gateway node 420 can relay the operational profile to femtocell AP 410 through content(s) 406 transported via broadband wired backhaul network backbone 405 (e.g., Iuh or IuB interface in UMTS-based embodiments); femtocell AP 410 delivers the operational profile to leased mobile device 402 via wireless link(s) 403. Delivery of the operational profile is based on packet-switched communication, with routing of content(s) 406 and paging of signaling 408 managed by femto gateway node 420. Backhaul broadband wired backhaul network pipe 405 can be embodied in one or more of a optical fiber backbone, a twisted-pair line, a T1/E1 phone line, a digital subscriber line (DSL) either synchronous or asynchronous, an asymmetric DSL, a coaxial cable, etc. Femtocell AP 410 is typically connected to the broadband wired backhaul network backbone via an external or internal broadband modem (not shown).

In addition, synchronization of an operational profile can occur to persist changes to an operational profile within lessee record storage 134. Such changes can be effected through utilization of leased mobile device 402, and uploaded to leasing platform 110 via femtocell AP 410. In an aspect, an updated operational profile can be delivered within content(s) 406 to femtocell AP 410, which relays the operational profile to femto gateway node 420 via backhaul pipe 405, which in turn delivers the operation profile to leasing platform 110 as part of content(s) 406. Leasing platform 110 retains the updated operational profile within lessee record storage 134.

With respect to FIG. 4B, example system 450 enables synchronization of contents amongst a leased mobile device and a leasing platform through a macrocell network. As indicated supra, synchronization of content(s), e.g., lessee-specific operational profile(s), can occur to implement one of the following: configure an operational profile for a newly leased mobile device, update a configured operational profile in a leased mobile device, or update an operational profile within a lessee record storage. To download an operational profile, mobile device can convey an indication to deliver the operational profile, the indication transmitted as part of signaling 408. Macrocell base station 460 relays such indication to control node(s) 470 via link 265, the indication is transmitted to serving node 480, which conveys such indication to leasing platform 110. Communication amongst control node(s) 470 and serving node 480 is effected through link 475. In one or more embodiments, particularly in UMTS-based embodiments, link 265 is a IuB interface and link 475 can be embodied in one or more of Iu-packet switched (Iu-PS) or Iu-circuit switched (Iu-CS) interfaces. Moreover, in further embodiments, particularly in LTE-based radio technology, link(s) 265 and control node 470 can reside within base station 460. In response to the received indication to deliver the operational profile, leasing platform 110, e.g., through synchronization component 116, retrieves the operational profile from lessee record storage 134 and conveys it as part of content(s) 406 to serving node 480. The latter relays the operational profile to control node(s) 470 for delivery to base station 460, which in turn transmits the operational profile over the air, via DL in wireless links 455, to leased mobile device 402.

To upload an operational profile, leased mobile device 402 can convey a request to transmit the operational profile and, if acknowledgement of the request is received, delivers the operational profile as part of content(s) 406. Request to transmit and acknowledgement thereof can be conveyed as part of signaling 408. Base station 460 receives the operational profile and relays it to control node(s) 470, which transmits it to serving node 480, which in turn deliver the profile to leasing platform 110. The latter, via, e.g., synchronization component 116, records the received operational profile in lessee record storage 134.

Figure 5:
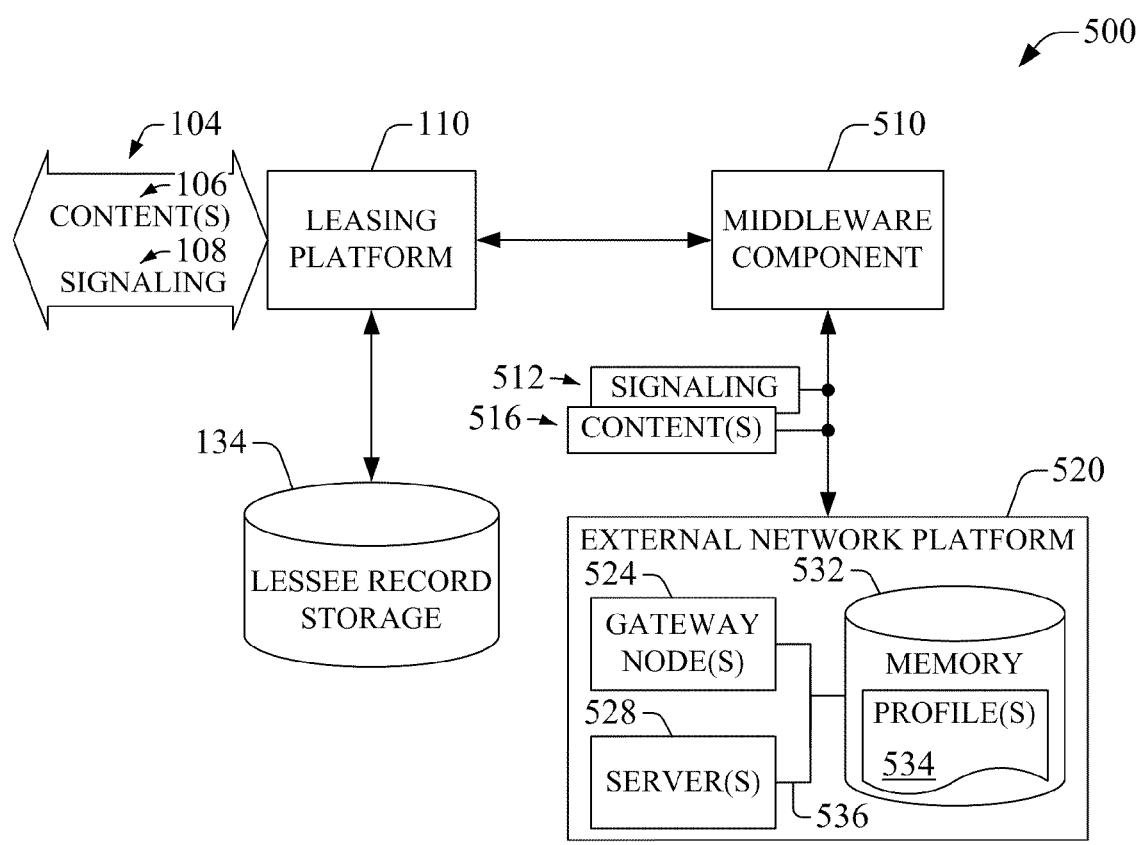
FIG. 5 is a block diagram of an example system that synchronizes content(s) in an external network platform with a leasing platform in accordance with features of the subject innovation.

FIG. 5 is a block diagram of an example system 300 that synchronizes content(s) in an external network platform with a leasing platform in accordance with features of the subject innovation. External network platform can be a network that provides a specific service, and can be associated with a lessee of a mobile device. Examples of an external network platform include enterprise local area network (LAN), internet service provider (ISP) network, substantially any private data network (PDN), or the like. Synchronization can be event driven. In an aspect, synchronization can be performed if content(s) within external network platform 520 are updated and such content(s) affect operation of a leased device, or a new lease is effected for a mobile device and configuration of a service provided through external network 520 is at least in part necessary for operation of the leased mobile device. Content(s) can include service profiles (e.g., 534) for a specific service provided by the external network platform 520; the specific service can be provided by one or more server(s) 528. Synchronization component 116 can enable such synchronization of content(s), e.g., lessee-specific operational profiles for an ongoing lease agreement. As an example, if an email server (e.g., one of server(s) 528) is updated and protocol for email delivery and retrieval is modified, external network platform 520 can signal such update to synchronization component 116 within leasing platform 110. Subsequent to acknowledgement of the signal, synchronization component 116 (not shown) can collect updated information and generate, e.g., through profile management component 120 (not shown), an updated profile which can be retained within an account of the affected lessee in lessee record storage 134. As another example, if a new mobile device is leased, synchronization component 116 can request information associated with one or more services provided through external network platform 520, e.g., email delivery, and configure an operation profile with adequate configuration for the one or more services, which can be downloaded to the leased mobile device at the time the lease is effected.

In addition or in the alternative, synchronization can be driven through polling of service node(s), e.g., one or more server(s) 528, in external network platform 520 to determine if changes to service profile(s), e.g., profiles(s) 534 retained in memory 532, have been committed. Polling period $\tau$, or rate $\tau^{-1}$, can be configured by leasing platform 110, via, for example, synchronization component 116. Likewise, a polling schedule also can be configured by synchronization component 116 to request service profile update(s) at predetermined intervals. In response to polling, if a service profile has been updated within external network platform 520, gateway node(s) 524 can deliver the updated service profile as part of content(s) 516, and middleware component can relay such content(s) 516 to leasing platform 110.

Exchange of signaling and content(s) amongst leasing platform 110, or component(s) therein, and external network platform 520, can be accomplished through middleware component 510, which can relay received signaling and content(s) to leasing platform 110. Communication amongst middleware component 510 and gateway node(s) 524 can be effected through a reference link. Middleware component 510 can cast signaling 512 and content(s) 516 exchanged with external network platform 520 in format(s) suitable for utilization at leasing platform 110, or component(s) therein. Likewise, middleware component 510 can format signaling received from leasing platform 110 to ensure compatibility with gateway node(s) 524. Formatted signaling can be delivered through signaling 512. While in example system 300 middleware component 510 is illustrated as external to leasing platform 110, in one or more alternative or additional embodiments, middleware component 510 can be part of leasing platform 110.

As described supra, synchronized content(s) can be delivered to the leased mobile device over-the-air (OTA) through macrocell network, or via femtocell network; selection of either network can be based at least in part on synchronization criteria.

Figure 6:
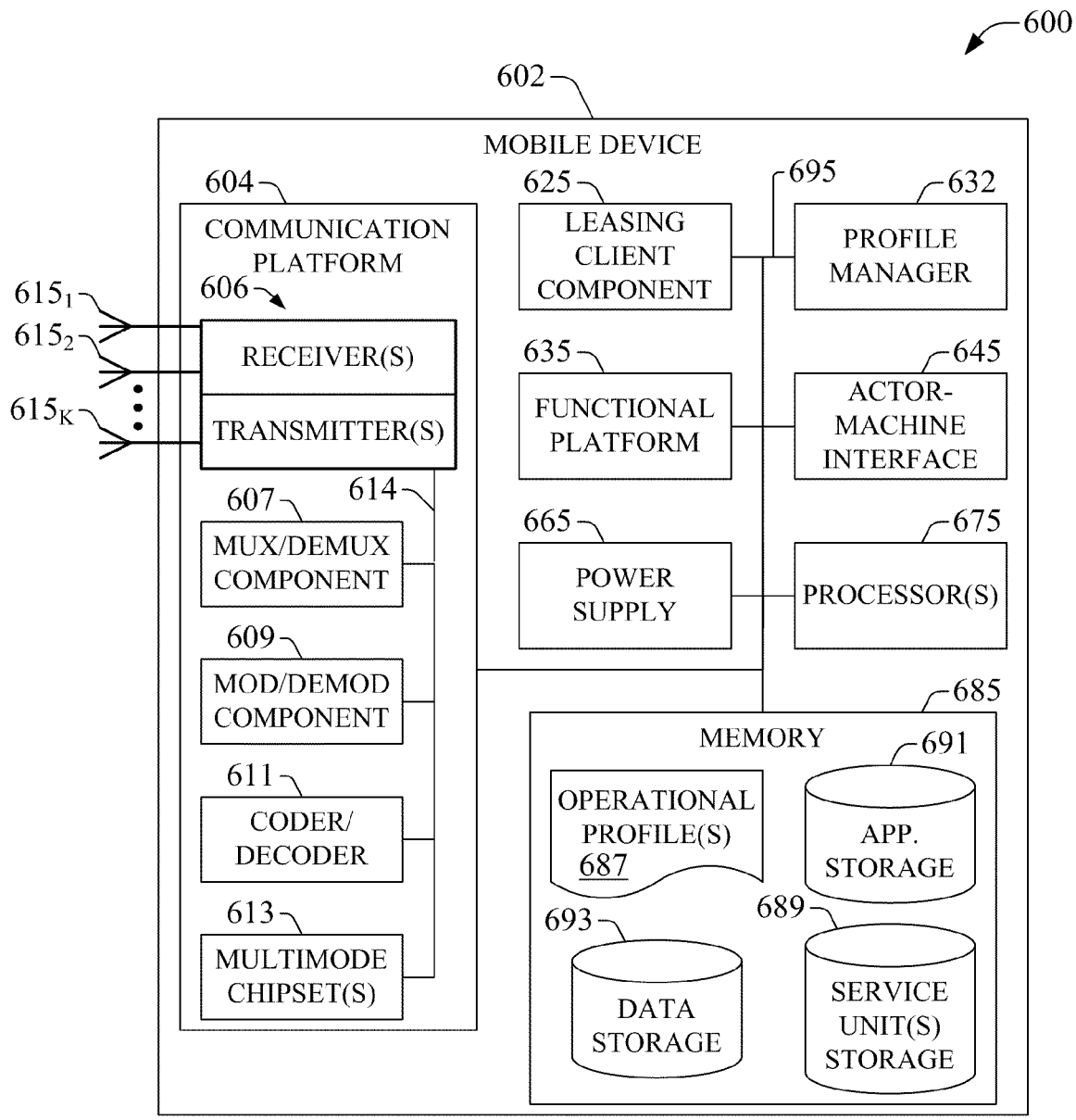
FIG. 6 illustrates a block diagram of an example embodiment of a mobile device that can be leased in accordance with aspects described herein.

FIG. 6 illustrates a block diagram of an example embodiment 600 of a mobile device 602 that can be leased in accordance with aspects described herein. Mobile device 602 also can embody a pseudo-stationary or tethered device that can communicate wirelessly can be operated within a lease agreement. To enable wireless communication, and transmit and receive data and signaling wirelessly, mobile device 602 includes a communication platform 604, which comprises a set of receiver(s)/transceiver(s) 606; each transceiver in the set includes an antenna $615_\lambda$, with $\lambda=1, 2, \ldots K$, with K a natural number greater or equal than unity. One or more of receiver(s)/transmitter(s) 606 can be configured, e.g., by a base station or component(s) therein, to operate in multiple-input multiple-output (MIMO) telecommunication mode. Receiver(s)/transmitter(s) 606 include respective filter(s) and amplifiers. The filters are installed between antenna(s) $615_\lambda$ and the amplifier(s), and tune specific portions of EM radiation spectrum available for telecommunications.

Communication platform 604 comprises electronic components and associated circuitry that enable processing and manipulation, e.g., coding/decoding, deciphering, modulation/demodulation, of wireless signal(s) received by mobile device 602 and wireless signal(s) to be transmitted by mobile device 604; the wireless signal(s) modulated and coded, or otherwise processed, in accordance with various radio technology protocols. Components, or functional elements, in communication platform 604 exchange information through a bus 614; information includes data, code instructions, signaling, or the like, and the bus 614 can be embodied in at least one of a system bus, and address bus, a data bus, a message bus, or a reference link or interface. The electronic components and circuitry can include the set of K receiver(s)/transmitter(s) 606 and component(s) therein, a multiplexer/demultiplexer (mux/demux) component 607, a modulator/demodulator component 609, a coder/decoder 611, and a set of one or more chipsets, e.g., multi-mode chipset(s) 613. As indicated above, the transceivers includes receiver(s)/transmitter(s) 606 that can convert signal from analog to digital upon reception, and from digital to analog upon transmission. Receiver(s)/transmitter(s) 606 also can divide a single data stream into multiple parallel data streams, or perform the reciprocal operation; such operations typically conducted in various multiplexing schemes. Functionally coupled to receiver(s)/transmitter(s) 606 is a multiplexer/demultiplexer (mux/demux) component 607 that enables processing or manipulation of wireless signal(s) in time and frequency space or domain. Electronic mux/demux component 607 can multiplex and demultiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 227 can scramble and spread information (e.g., codes) according to substantially any code; e.g., Hadamard-Walsh codes, Baker codes, Kasami codes, polyphase codes, and so on. A modulator/demodulator (mod/demod) component 609 also is a part of communication platform 604, and can modulate and demodulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In embodiment 600, mod/demod component 609 is functionally coupled to mux/demux component 607 via bus 614. In addition, processor(s) 675 enables, at least in part, mobile device 602 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Communication platform 604 also includes a coder/decoder 611 that operates on data in accordance with one or more coding/decoding schemes suitable for telecommunication through one or more receivers(s)/transmitter(s) 604. When communication platform 604 exploits MIMO, MISO, or SIMO operation, coder/decoder 611 can implement at least one of space-time block coding (STBC) and associated decoding; or space-frequency block (SFBC) coding and associated decoding. Coder/decoder 611 also can extract information from data streams coding in accordance with spatial multiplexing scheme. To decode received information, e.g., data or control, coder/decoder 611 can effect at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. In addition, to operate in the manner described herein, coder/decoder 611 can employ, at least in part, mux/demux component 607 and mod/demod component 609.

A network operator that manages lease program can configure, as part of provisioning of mobile device 602, a set of electromagnetic (EM) radiation frequency bands and a set of radio technologies that communication platform 604 and components therein can exploit for wireless communication. The set of EM radiation frequency bands, also referred to herein as frequency bands, can comprise radio frequency (RF) portion(s) and microwave portion(s) of the EM spectrum, although other spectral regions such as infrared (IR) also can be included. In an aspect, the set of EM radiation frequency bands can include at least one of (i) all or substantially all EM frequency bands licensed by the network operator (e.g., PCS bands, AWS bands, GWCS bands, and so forth); or (ii) all or substantially all unlicensed frequency bands currently available for telecommunication (e.g., the 2.4 GHz Industrial, Scientific and Medical (ISM) band or one or more of the Unlicensed National Information Infra-structure (UNII) bands in the 5 GHz range). It is noted that as part of network upgrades, the network operator can add frequency bands, or frequency carriers therein, to the set of EM radiation frequency bands as such bands or carriers become available for telecommunication, e.g., auctioned for utilization or authorized for free-of-charge utilization. Similarly, as new radio technologies become standardized, or available, the network operator can introduce such technologies in the set of radio technologies that can be utilized for telecommunication by mobile device 602.

Additionally, in embodiment 600, multimode chipset(s) 613 can allow mobile device 602 to operate in multiple communication modes through various radio network technologies (e.g., second generation (2G), third generation (3G), fourth generation (4G)) or deep-space satellite-based communication in accordance with disparate technical specifications, or standard protocols, for the radio network technologies or satellite communication. In an aspect, multimode chipset(s) 613 can enable, at least in part, communication platform 604 to operate in accordance with standard protocols specific to a telecommunication mode of operation, e.g., LTE-based communication. In another aspect, multimode chipset(s) 613 can be scheduled to operate concurrently (e.g., when K>1) in various modes or within a multitask paradigm in which the multimode chipset(s) 613 operates in a dedicated mode for a specific time interval. In yet another aspect, multi-mode chipset(s) enable communication platform 604 to receive global positioning system (GPS) pilot signals, e.g., timing message(s), orbit information, from one or more deployed global navigation satellite systems (GNNSs). Such navigation data allows, at least in part, asset protection in a lease program as described herein.

Communication platform 604 can receive and deliver leasing configuration information, which can include lease initiation or termination, lease renewal, operational profile availability, update(s) to lease terms, return information for a leased device, etc. Received information can be relayed to leasing client component 625, also referred herein to as leasing component 625. Leasing client component 625 can supply at least a portion of the lease information to actor-machine interface 645, which renders the lease information. In addition, leasing component 625 can receive leasing information from actor-machine interface 645 and supply the information to communication platform 604 for delivery of such information. It should be appreciated that actor-machine interface 645 also can be deployed within POL terminal 155 as an embodiment of a user interface thereof. It should be appreciated that resources, e.g., hardware resources or software resources, available to actor-machine interface 645 and a user interface within POL 155 are generally different. For instance, a display screen that embodies, at least in part, a display component within actor-machine interface 645 has substantially smaller real estate than a display screen that can be part of a user interface in POL terminal 155.

Leasing component 625 also can generate service unit "banks" or "buckets" which are local to mobile device 602 and can be retained as part of service unit storage 689. The service unit banks are configured in accordance with received lease agreement term(s), e.g., leased service units. The local service unit banks are substantially a duplicate of service unit banks retained at the network level, e.g., stored in service unit storage 142 within memory 130.

Profile manager component 635, also referred herein to as profile manager 635, can provision an operational profile for mobile device 602; the operational profile is lessee specific. To at least that end, profile manager component 635 can receive an indication a set of operational profiles is available for the leased mobile device, e.g., 602; if the set includes a single operational profile, profile manager 635 can acknowledge the received indication; receive the operational profile and store it in memory element 687. In case more than one operational profile is available in the set, the received indication can include a request to select an operational profile. Profile manager 635 can deliver the request to actor-machine interface 645, which can render the request through aural or visual indicia. Subsequent to selection, respective data is received by profile manager 635, which can then acknowledge the indication of available profile, submit selection data, and receive the selected operational profile. In an alternative aspect of profile selection, profile manager component 635 can collect an operational profile that is pre-selected for review and convey the collected operational profile to actor-machine interface 645 to render it; the pre-selected operational profile can be cached in data storage 693 and committed to memory element 687 if selected for provision. To acknowledge the indication, profile manager 635 codes and delivers and acknowledgement (ACK) signal, which can be embodied, for example, in one or more reserved bits in a packet header, a light-payload (e.g., of the order of 1 byte) data packet, a predetermined multi-bit word conveyed in a radio frame within a control channel, etc. In another aspect, a network component or system, e.g., leasing platform 110, can supply, (e.g., generate or collect and deliver) the available operational profiles in the set.

In an aspect of provision of an operational profile, profile manager component 635 can enable manipulation of a received operational profile prior to recordation of such profile in memory element 687. Profile manager component 635 can receive directive(s) to operate on the operational profile through actor-machine interface 645. Manipulation of the operational profile includes edition of current field attribute(s) in the profile, or addition of new field attribute(s). In the illustrated embodiment, profile manager component 635 can provide manipulation tool(s) through execution, via at least in part processor(s) 655, of a set of code instructions retained in memory element 691.

In addition, profile manager 635 also can update and deliver operational profile(s) for mobile device 602. Delivery is accomplished, at least in part, through communication platform 605. Moreover, based at least in part on features of the operational profile(s), delivery thereof can be effected through a femtocell network or a macrocell network. Predetermined criteria can establish conditions to select one of the two networks. A network operator, or telecommunication carrier, that administers leasing program of mobile device(s) can configure the criteria; leasing client component 625 can receive the criteria via communication platform 605 and retain it in synchronization criteria (not shown) within memory 685. Such selection criteria, or synchronization criteria, can include one or more thresholds for at least one of profile size, available network resources, and network load that enable selection of femtocell or macrocell network. For example, small profiles can be synchronized over the air through macrocell network infrastructure (e.g., Node B, radio network controller . . . ), whereas large profiles can be synchronized via femtocell network, exploiting the associated broadband backhaul pipe. For another example, when load conditions of a served sector or cell in which the leased device operates is low, the macrocell network can allocate suitable resources for delivery of an updated profile substantially irrespectively of its size. Updated operational profiles can be retained in memory element 685.

To update an operational profile, profile manager 635 can collect updates to various lessee-specific settings and configured preferences of mobile device 602. For example, when changes to a Post Office Protocol (POP) email account configuration are recorded, e.g., in data storage 693, profile manager 635 can update one or more operational profiles retained in memory element 687 to reflect the revised email configuration. Likewise, changes effected to a calendar or schedule, which can be retained in data storage 218, can be collected and an operational profile updated accordingly. It should be appreciated that collected updates can be generated by either an actor that operates mobile device 610 or received as part of a network-based update to the profile.

Figure 7:
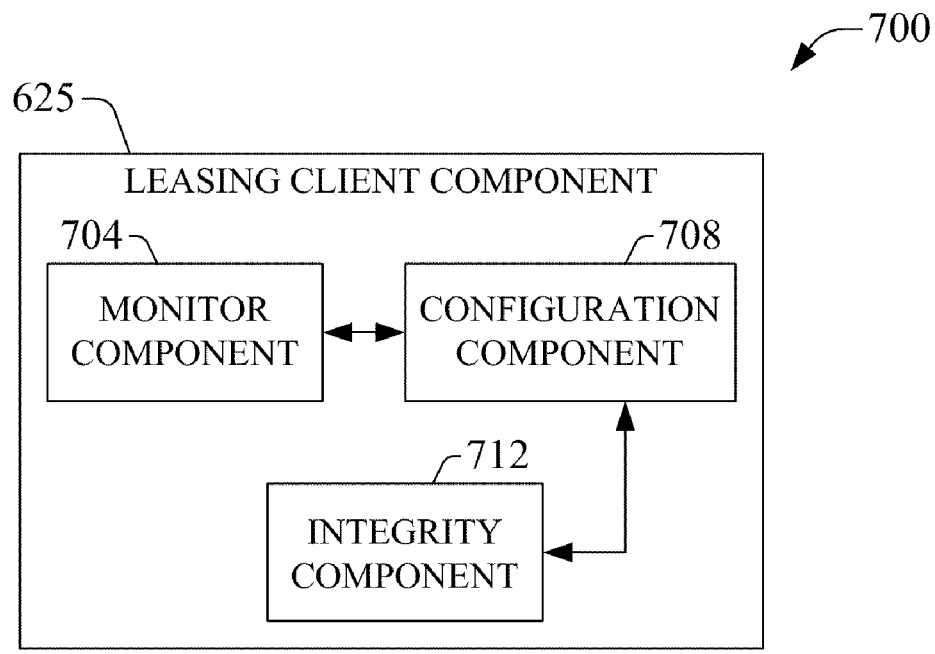
FIG. 7 illustrates an example embodiment of a leasing client component in accordance with aspects described herein.

Leasing client component 625 can monitor utilization of service in a current lease and update service unit bank(s) in service unit storage 689. In an aspect, to monitor utilization of service, at least one of the configured lease timer or a data buffer that records consumed airtime and data received or transmitted in a call session is polled; a data buffer is specific to a call session and can be retained within data storage 693. In an example embodiment, illustrated in FIG. 7, monitor component 704 can poll the lease timer or the data buffer. Based at least in part on data generated or collected through monitored service utilization, monitoring component 218 updates service unit bank(s).

As part of lease utilization monitoring, leasing client component 625 also can perform reconciliation of leased service usage with service consumption records retained at the network level, e.g., within a network that includes leasing platform 110 and component(s) therein such as billing component 218 and memory 130. In addition, leasing client component 625 can supply utilization message(s) that convey a current or substantially current level of lease utilization. In an aspect, actor-machine interface 645 can receive and render the utilization message(s); as an example, such message(s) are rendered as one of aural of visual indicia. In another aspect, utilization message(s) can be supplied via wireless communication, e.g., point-to-point (PTP) short-range telecommunication, to a wireless-enabled device such as a personal computer (PC) or a vehicular navigation system, which can render the utilization message(s). The PTP short-range telecommunication can utilize various radio protocols that do not rely on network infrastructure (e.g., Bluetooth®, infrared telecommunication protocol(s) such as Infrared Data Association® (IrDA) protocol(s) . . . ).

When service units (e.g., minutes and MBs) allotted to a current lease are exhausted, leasing client component 625 terminates the lease and renders a leased mobile device, (e.g., 602) unable to make or receive calls, except E-911 calls, and send or receive data, with exception of data generated as part of renewal of the terminated lease. In an example embodiment, illustrated in FIG. 7, monitor component 704 codes an indication of termination of a current lease, and delivers it to configuration component 708, which locks at least a portion of the functionality of mobile device 602 and supplies an environment to renew the terminated lease, or lease agreement. Functionality that remains available includes at least one of emergency calling (e.g., access to enhanced 911 (E911) service), tracking functionality of leased mobile device, and operational features of renewal environment. It is noted that to lock at least a portion of the functionality of mobile device 602 at the expiration of a lease period can require leasing client component 625 to have control over each of the functional aspects of the mobile device that are disabled. Such control can be granted by mobile device manufacturer to the network operator(s) that provision operation of a mobile device under a lease agreement in accordance with aspects described herein.

In an aspect, actor-machine interface 645 receives one or more directives to render the environment to renew the lease. As part of such environment, actor-machine interface 645 renders indicia to prompt a lessee of mobile device 610 to renew an expired lease; to update lease terms; to select a specific operational profile; to receive directions to a point of lease (POL); or the like. In addition, actor-machine interface 645 can receive input from lessee through one or more gestures (e.g., touch, speech, motion); a data entry interface within actor-machine interface 645 can cast such input into data. To mitigate fraudulent or undesired renewal(s) of a lease, in an embodiment, e.g., 700, integrity component 712 can secure input related to lease renewal through various credential-based mechanisms, such as password protection, biometric protection, or the like, and associated secured transport protocol(s) which include data encryption.

When leasing client component 625, receives, for example, via configuration component 708, an indication to renew the terminated lease and, if available, data to update lease terms, such as revised volume of leased service units, updated billing information, desired add-on services, or the like, leasing client component 625, e.g., via configuration component 708, can relay the indication to renew and available data to leasing platform 110. The request to renew the terminated lease is processed in substantially the same manner as described supra; if the request is approved, leasing platform 110 delivers an indication of active lease. Configuration component 708 receives the indication of active lease and restores functionality of the leased mobile device. In addition, leasing client component 625 configures service unit bank(s) in accordance with the renewed lease and profile manager 635 provisions an operational profile, as described supra.

When a lease is not renewed, network operator that leases the mobile device can pursue asset protection: Leasing client component 625 can receive a request to generate a location estimate and transmit the location estimate to leasing platform 110, or a component therein, such as tracking component 118. The request can be conveyed as part of signaling 108, whereas the location estimate can be received as part of content(s) 106. For leased mobile device with global positioning system (GPS) navigation functionality, the leased mobile device can generate an estimate of the current or substantially current location based at least in part on received GPS navigation data. In the alternative, for leased mobile device without GPS functionality, a location estimate can be generated via UL TOF measurements, such as UL-TOA or UL-TDOA. In example embodiment 700, integrity component 712 can generate location estimates based on at least one of GPS data or TOF measurements. It should be appreciated that location capabilities of a leased mobile device are unavailable to a lessee for disablement during a lease period. In addition or in the alternative, location capabilities can be re-enabled at the expiration of a lease agreement in scenario(s) in which such capabilities are disabled during a lease agreement.

Further to enabling wireless communication of voice or data, mobile device 602 can provide a specific functionality; for instance, device 602 can be a mobile phone, a photography camera, a video camera, a wireless dedicated computer, a navigation device, a printer or photocopier, a scanner, a fax machine, or the like. Such specific functionality can be supplied primarily through a functional platform 635 that comprises a set of components (not shown) that enable, at least in part, one or more specific functionalities that can complement or supplement wireless communication. It should be appreciated that functional platform 635 can exploit applications retained in application storage 691 in order to provide one or more functionalities of mobile device 602. As an example, in an aspect of the subject innovation, application storage 691 can include an application that, when executed, can provide tutorial(s) for operation of mobile device 602. The tutorial(s), which can include video or audio, can be interactive and based on specific requests from an end user, e.g., a lessee: For instance, the end user can type or speak a specific operation (e.g., place a phone call, deliver a text message) that is desired to be conducted with the mobile device 602, and the mobile device 602 can execute a tutorial application that conveys an explanation or illustration of how to proceed (e.g., keystroke sequence) to accomplish the desired operation. As another example, when mobile device 602 is a telephone, functional platform 635 can include functional elements such as a data entry interface (e.g., a touch screen, a keyboard, a biometric pad for biometric-based access, a microphone, a loud speaker), a camera, peripheral connectors (e.g., a universal serial bus (USB) port or an IEEE 1394 port for transferring data to, or exchanging data with, a disparate device), a voice coder-decoder; intelligent component(s) that can respond to voice activated command(s); and so on.

Actor-machine interface 645 also can render visual or aural indicia that control functionality of mobile device 602 as supplied through functional platform 635, or reveal operational conditions of mobile device 602; for example, e.g., battery level, radio technology employed for communication, or the like.

Mobile device 602 includes processor(s) 675 configured to provide or that provide, at least in part, functionality to substantially any or any component(s) or platform(s), interface(s), and so forth, within mobile device 602 in accordance with one or more aspects of the subject innovation. In embodiment 600, processor(s) 675 is illustrated as external to the various functional elements (e.g., component(s), interface(s), platform(s)) of mobile device 602; however, in additional or alternative embodiments, processor(s) 675 can be distributed amongst a plurality of such various functional elements. Processor(s) 675 is functionally coupled to each functional element within mobile device 602 and to memory 685 through bus 695, which can be embodied in at least one of a memory bus, a system bus, an address bus, a message bus, or one or more reference link(s) or interface(s). In addition, processor (s) 675 can store information in and retrieve information from memory 685, wherein the information can enable, at least in part, operation and/or can provide, at least in part, functionality to communication platform 605, and at least a portion of component(s) therein; leasing client component 625 and component(s) therein; profile manager component 635; functional platform 635 and component(s) therein; as well as other operational components (not shown) of mobile device 602. The information can include at least one of code instructions, code structure(s), data structures, or the like. Processor (s) 675 can execute code instructions stored in memory 685, for example within app. storage 691, or other memory(ies) functionally coupled to mobile device 602, to provide the described functionality of mobile device 602. Such code instructions can include program modules or software or firmware applications that implement various methods described in the subject specification and associated, at least in part, with functionality of mobile device 602.

Memory 685 can retain, at least in part in an application storage 691, at least one of data structures (e.g., objects, classes, metadata); code structure(s) (e.g., modules, procedures) or instructions; or substantially any type of software or firmware that processor(s) 675 can execute to provide functionality associated with substantially any or any component (s), platform(s), interface(s), or functional element(s) within mobile device 602 in accordance with aspects of the subject innovation. In addition, memory 285 can store network or device information, e.g., within data storage 693, such as encoded pilot signal(s); one or more communication protocol (s) or technical specification(s); code sequences for scrambling or spreading; blind decoding hypotheses; semi-persistent scheduling parameters; frequency offsets, macrocell and femtocell identifiers (IDs); address book(s); or the like. Moreover, memory 685 can retain content(s) such as multimedia files or subscriber-generated data; security credentials (e.g., passwords, encryption keys, digital certificates, biometric keys such as voice recordings, iris patterns, fingerprints, deoxyribonucleic acid (DNA) profiles); hardware identifying tokens or codes such as at least one of an IMSI, a temporary mobile subscriber identity (TMSI), packet TMSI (P-TMSI), an IMEI, an MDN, a MIN, a TIA ESN, or a multi-bit identification number such as MEID. It is noted that memory 685 can include affixed or removable elements such as a subscriber identification module (SIM) card storage, a universal integrated circuit card (UICC) storage, or a removable user identity module (RUIM).

Mobile device 602 also includes power supply 665, which can provision power to one or more components or functional elements that operate within mobile device 602. In an aspect, power supply 665 can be rechargeable, e.g., it can be embodied in a rechargeable battery. In addition, power supply 665 can include one or more transformers to achieve power level (s) that can operate mobile device 602 and components or functional elements, and related circuitry therein. In an aspect, power supply 665 can attach to a conventional power grid to recharge or ensure mobile device 602 is operational; power supply 665 can include an input/output (I/O) interface (not shown), or connector (not shown), to functionally attach to the conventional power grid. Power supply 665 also can include an energy conversion component (not shown) such as a solar panel or a thermoelectric device or material, which can be external or internal to the mobile device 602, in order to provide additional or alternative power resources or autonomy to mobile device 602.

Figure 8:
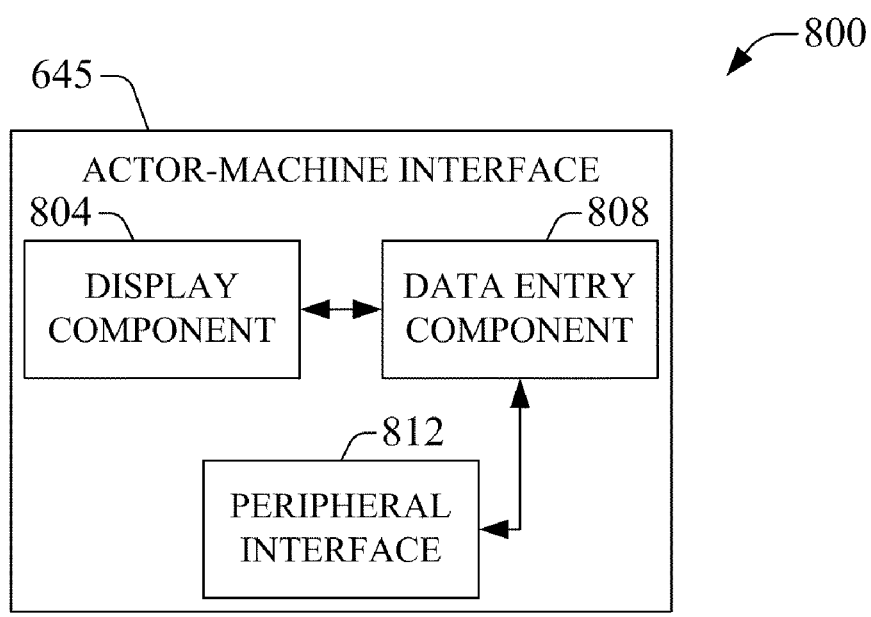
FIG. 8 displays an example embodiment of actor-machine interface that can be part of a point-of-lease terminal or a leased mobile device in accordance with aspects described herein.

FIG. 8 displays an example embodiment 800 of actor-machine interface 645 in accordance with aspects described herein. Display component 804 can render prompt(s) or other content(s) associated with leasing a mobile device; to at least such end, display component 804 can convey visual or aural indicia. Various schemes can be employed to render the prompts or other content(s) such as, but no limited to, windows-based schemes, e.g., iconic representation, pop-up representation; or text-based representation, with scroll-down or scroll-sideways delivery, or static rendering. In addition, the prompts or other content(s) can be organized in various configurations within a rendering area (e.g., display screen) that can be a part of display component 804. In an aspect, display component 804 can be embodied, at least in part, in a display element within a monitor such as a cathode ray tube (CRT) monitor, a Liquid Crystal Display (LCD) monitor, a plasma monitor, a light emitting diode (LED) monitor, an electrochromic monitor, or the like.

In example embodiment 800, data entry component 808 can collect input from an end user as part of leasing a mobile device autonomously, e.g., without intervention of a customer representative of the network operator that manages the leasing program. Such input can be received in response to prompts rendered to the end user as part of leasing navigation. Display interface 804 can process (e.g., decode/code), at least in part, the input and convey it as signaling to at least one of leasing component 625, memory 685, or to a network component, e.g., registration component 112. At least one of the leasing component 625 or network component can receive the signaling and utilize it to implement at least a portion of leasing the mobile device.

Various functional elements and associated circuitry that can embody, at least in part, data entry component 808 allow data input; such functional elements can include a keypad, a touch screen, a microphone, a camera(s); an accelerometer; a bar code reader, RFID reader, or infrared (IR) wireless-based reader; or the like. Moreover, data entry component 808 also can be functionally coupled to peripheral interface 812 that enables connection to a peripheral device and communication therewith. In an aspect, peripheral interface 218 can include a set of ports, which comprises at least one of parallel ports, serial ports, Ethernet ports, V.35 ports, X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394.

FIG. 9 illustrates an example rendition 900 of an indication to renew a lease. A pop-up window 910 prompts an actor that operates the leased device to renew the lease. The actor can convey its choice by selecting one of a "Yes" or "No" entry, illustrated as blocks 912 and 914, respectively. Selection can be enacted through various gestures, based at least in part on the functionality of the actor-machine interface that includes display area 905. The selection is supplied, e.g., signaled, to leasing component 625 for processing; for instance, re-initiation of service unit banks or buckets.

In rendition 900, an information icon 916 that can initiate rendering of lease information (e.g., lease terms, available add-on services . . . ) is also displayed and can be actuated through various gestures (e.g., touch, speech, motion). Information icon 916 can be displayed substantially at all times during operation of a leased device to supply information on leased utilization, e.g., remaining service units, remaining rental time, leased add-on services. Such information also can include a "Renew" soft-button that reinitiate lease terms prior to formal expiration thereof; such feature can be advantageous to determine whether available leased service units are sufficient for a call session (e.g., voice or data) such as a teleconference for a job interview, inventor disclosure session, or the like.

FIGS. 10A-10C presents example renditions of various prompts subsequent to election to renew a lease of a mobile device. Rendered information and format thereof is supplied, in an aspect, by leasing client component 625. Rendition 1010 prompts a lessee to select renewal for a current device (as shown with a checkmark) or a new device. Selection of a device type or model to be leased in renewal leads to the prompt illustrated in rendition 1020, in which an actor that operates the device is prompted to update lease terms if a renewal selection has been received at leasing client component 625 within the leased mobile device; selection is entered through interaction with either of boxes 1032 and 1034.

Example rendition 1030 prompts a lessee to select a specific device if a selection to renew a new mobile device is conveyed through a rendered prompt. A list of devices 1032 available for lease from a telecommunications carrier that administers a lease program is rendered. It should be noted that list 1032 can include all or substantially all devices available to lessee. Listed devices can be determined based at least in part on current lessee rating (see, e.g., FIG. 3). Selection of a specific device, through a gesture, can pre-select the device ("DEV_K+3"; pre-selection illustrated in boldface) and offer details about features of the device (e.g., radio technology capabilities) or services available to the device; such information retrieved through actuation of predetermined indicia such as a soft-button labeled "More." In rendition 1030, an information icon 1036 can be available to supply evaluation tools and information related to devices available for list. For instance, actuation of information icon 1036, e.g., via a touch gesture, can render an evaluation environment (not shown) that can display rankings of rented devices, battery lifetime, identification of comparable devices from competing telecommunications carriers, etc. Data supplied through actuation of information icon 1036 can be downloaded (e.g., requested and received) from a serving network, via leasing client component 625 through communication platform 604.

Some devices in list 1032 can be offered under various promotional plans; such devices are illustrated with a "P" label in rendition 1030—other indicia can be employed to indicate a device offered for lease under a promotional arrangement. As described supra, promotional plan(s) can be generated by promotional planning component 1510. Configuration of promotional lease term(s) can be received by leasing client component 625 via communication platform 604.

FIG. 11 illustrates a rendition 1100 of a lease update environment, which can be rendered if a selection to update lease is received at a leased mobile device; in an aspect, leasing client component 625 receives the selection indication and signals actor-machine interface 645 to render the lease update environment. Such environment can include indicia 1104 that enable, at least in part, control of leased voice service units, e.g., minutes (min). As illustrated, airtime can be set within a lower bound $t_m$ and an upper bound $t_M$; a sliding soft-button (solid triangle in the drawing) can be employed to select leased airtime. An "unlimited" (U) option also can be available. Trackball manipulation, screen touch, speech, or other gestures can control the sliding soft-button. Similarly, indicia 1108 enable, at least in part, control of leased data service units, e.g., megabytes (MBs). Data can be adjusted within bounds $d_m$ and $d_M$, via a sliding soft-button (solid triangle). An "unlimited" (U) option also can be elected. Billing information 1112 also can be updated within the lease update environment. At least one of credit card information or checking account information can be modified or newly selected for purposes of payment of lease. A billing address also can be updated. Additionally, add-on services can be modified or included with the updated leased. For instance, parental controls that regulate at least one of data activity (e.g., web-browsing, instant messaging, web-publishing such as in social networking portals . . . ) or voice activity can be configured. Parental controls can be advantageous employed in leased mobile devices that are provided for children to utilize.

In example rendition 1100, information icon 1126, when actuated, can supply historical data on past data and voice activity, which can serve as a guide to select updated service units. In addition, information icon 1126 can provide instruction on various available add-on services such as parental controls.

FIGS. 12A-12B present example renditions of environments for selection of an available operational profile for a legacy lessee that rents a new mobile device. In an aspect, selection is prompted by the availability of multiple operational profiles linked to a single billing instrument, e.g., a valid credit card number. For example, the various profiles can include an operational profile for a personal mobile device and an operational profile for business-related mobile device, e.g., a smartphone to conduct business associated with an employer of a prospective lessee or lessee. In rendition 1200, a set of five operational profiles are conveyed and profile 3 is selected (illustrated by a checkmark). An indication of multiple available operational profiles and the operational profiles, e.g., profiles 1-5, can be received from a femtocell network by leasing component 625 via communication platform 605; the femtocell network operated by a wireless operator that administers leasing of the new mobile device. Profile manager component 632 can deliver the indication of multiple available profiles to actor-machine interface 645, which prompts selection of a profile (not shown) and supplies rendition 1200. The received multiple profiles, e.g., profiles 1-5, can be retained in memory element 687 and can be rendered by actor-machine interface 645 if manipulation of the profiles is requested. In rendition 1200, a toolbox icon 1204 labeled "Tools" can provide an environment (not shown) for manipulation of a selected profile; for example, field attributes in the profile can be displayed or edited, or new field attribute(s) can be added. Manipulation tool(s) accessed through toolbox icon 1204 also allows to persist changes to selected profile (e.g., profile 3) in memory 685, within memory element 687.

In alternative or additional rendition 1250, the set 1254 of five profiles can be conveyed in accordance with a disparate rendering model, in which high-level content of the profiles can be conveyed and the various profiles can be browsed upon actuation of a selector icon 1258 or through gestures that enable switching through the various profiles. Additionally, selection of a profile can be effected via a predetermined gesture such as a double-tap on a screen of the mobile device, a particular voice command, a specific hard-key combination, or the like. Toolbox icon 1204 also can be rendered to manipulate the selected profile. It should be appreciated that referenced five operational profiles serve only as illustration and the number of available operational profiles can be substantially any natural number.

FIG. 13 is an example rendition 1300 of an advisory notification to return a mobile device with an expired lease in accordance with aspects described herein. In addition to a message that indicates the mobile device lease is due, a notification 1304 of current or substantially current location for the device is rendered. As illustrated, the location can be conveyed in latitude and longitude coordinates; however, it should be appreciated that other formats (e.g., ZIP code, street address) for such location can be employed. As indicated supra (see, e.g., description of FIG. 1), current or substantially current location in the notification can be supplemented with a rendering of an address of a neighboring, e.g., the closest, POL and an icon 1308 that provides directions or a map to the neighboring POL. A locator link 1312 to a renewal environment also can be rendered as part of the notification. It should be appreciated that any portion of notification 1300 can be rendered through aural indicia. As described supra, an estimate of the current or substantially current location can be generated by at least one of the leased mobile device based at least in part on GPS navigation data or a serving network via a femtocell AP or a macrocell Node B.

While in illustrative renditions in FIGS. 9-13B the prompts are conveyed graphically, it should be appreciated that in alternative or additional renditions, aural indicia also can be employed, concomitantly with or separately from visual indicia, to prompt the actor to renew a mobile device lease and exercise any available selections.

Figure 14:
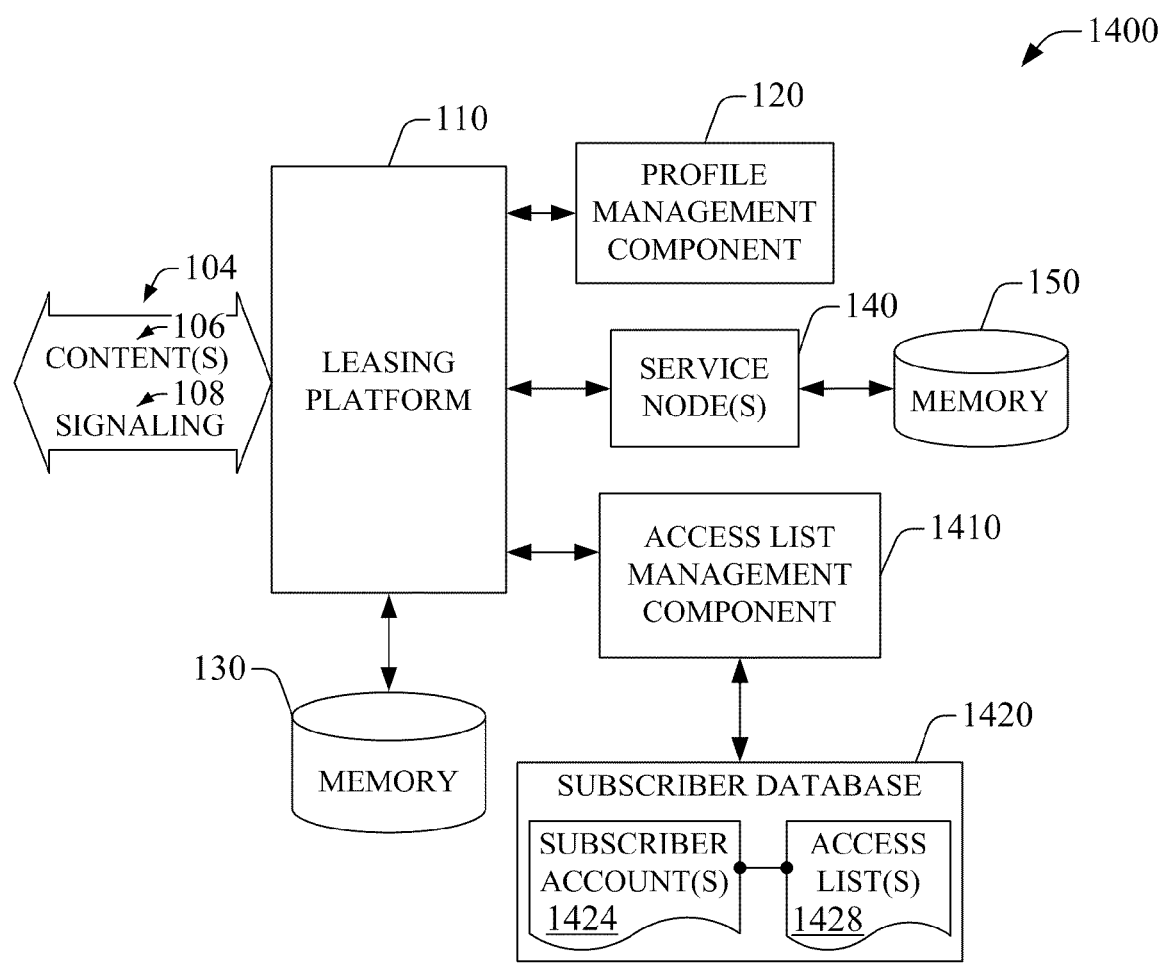
FIG. 14 is a block diagram of an example system that enables configuration of access list(s) to femtocell service based at least in part on leasing or cancellation thereof of a mobile device in accordance with aspects described herein.

FIG. 14 is a block diagram of an example system 1400 that enables configuration of access list(s) to femtocell service based at least in part on leasing or cancellation thereof of a mobile device. Access list management component 1410 can configure access list(s) 1428 that regulate access to femtocell service through a specific femtocell AP (e.g., 1410). In an aspect, regulation of access is accomplished through one or more field attributes within the an access list, with one of the field attributes being a mobile number of a wireless device, and other field attributes controlling access logic (e.g., service priority, access schedule, access quality of service . . . ) for the mobile number. It is noted that access list management component 1410 can convert a customary mobile directory number (MDN) to other identification code(s) or attribute(s) such as IMSI, IMEI, MIN, TIA ESN, or a multi-bit identification number, e.g., MEID. Such conversion generally employed for utilization at various levels within a serving network.

One or more access list(s) 1428 are typically associated (illustrated with a double-headed segment) with subscriber account(s) 1424. The association can be a one-to-none, e.g., a subscriber account does not include femtocell service; one-to-one, wherein a subscriber account includes a single femto AP; or a many-to-one, which occurs in a femtocell environment in which a subscriber account includes configured access list(s) for a plurality of femtocell APs, as it can be the case in an enterprise femtocell deployment with multiple deployed femtocell APs. Configuration can include addition of a mobile number, in one of the foregoing formats, to an access list if the mobile number has been assigned to a leased mobile device; or removal of a previously assigned mobile number, in one or the foregoing formats, for a mobile device with an inactive lease.

In an aspect, leasing platform 110, e.g., via registration component 112, can convey an indication a new lease is active for a mobile device, and a mobile number associated therewith. For lessees that are subscribers of the network operator that administers leasing program and are subscribed to femtocell service, access list management component 1410 can receive the indication and mobile number and add the mobile number to an access list associated with an access list associated to the subscriber's account within subscriber database 1420 (e.g., part of a Home Subscriber Server). In an aspect, an updated access list can be conveyed to a femtocell AP identified in the subscriber's account. In addition, access list management component 1410 monitors addition of the mobile number to access list(s) 1428 disparate from the subscriber's: When the mobile number is added to an access list, access list management component records the addition through identification of the updated access list; an identification registry can be retained within memory 130. Such recordation enables, at least in part, removal of added mobile numbers if an indication a lease for the mobile device linked to the mobile number is inactive, e.g., not renewed subsequent to lease term(s) expiration. To reduce processing load associated with monitoring of access list(s), a subset of access lists 1428 can be selected for monitoring. The selection can be based at least in part on lessee intelligence, e.g., retained in memory element 146, such as at least one of wireless marketplace wherein the lessee engaged in leasing a mobile device, marketplace(s) visited by lessee, e.g., due to roaming; geographical areas in which the lessee consumes wireless service(s).

It is noted that access list management component 1410 can be part of a femto gateway node (e.g., 420). Alternatively, access list management component 1410 can be embodied in a utility server (e.g., operation and maintenance (O&M) server) operationally coupled to the femto gateway node.

Figure 15:
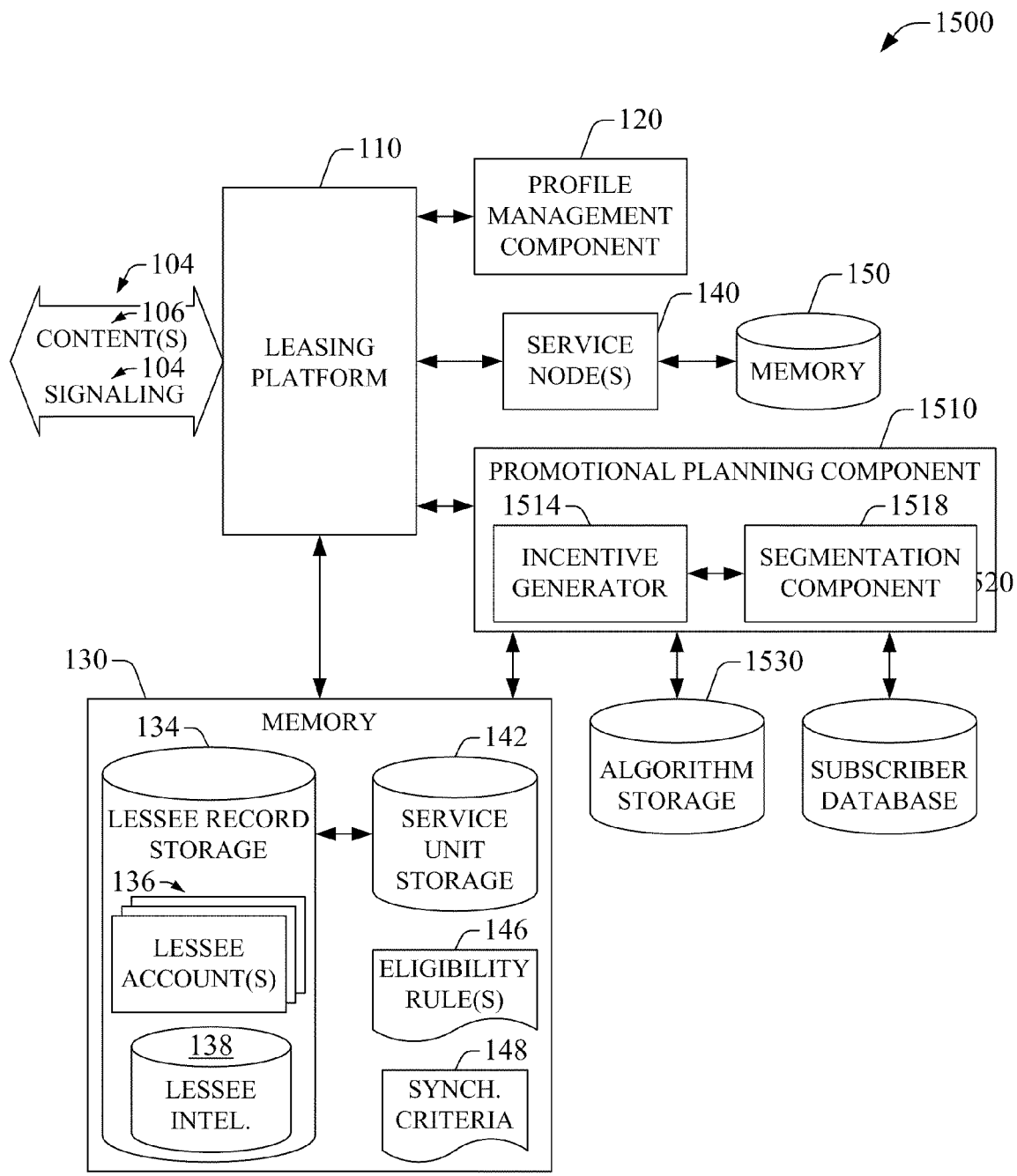
FIG. 15 is a block diagram of an example system that allows lease of a mobile device under promotional conditions in accordance with aspects of the subject innovation.

FIG. 15 is a block diagram of an example system 1500 that allows lease of a mobile device under promotional conditions in accordance with aspects of the subject innovation. While promotional planning component 1510 is illustrated as external to leasing platform 110, it is noted that in one or more additional or alternative embodiments of example system 1500, promotional component 1510 can be included in leasing platform 110. To drive adoption of leasing program, or to retain or generate revenue, promotional planning component 1510 can select a set of subscribers of a network operator that manages leasing program of a mobile device, and deliver promotional material that describes the leasing program and advantages for lessees thereof, including devices available for lease and their capabilities. It should be noted that subscribers are not lessees of a mobile device at the time selection occurs. Delivery of the promotional materials can be accomplished through leasing platform 110, or one or more components therein such as registration component 112. Promotional materials can be delivered as part of content(s) 106. Selection of the set of subscribers can be based at least in part on segmentation of subscribers according to commercial value of such subscribers. The selection can be carried out by promotional planning component 1510; in the illustrated example embodiment thereof, segmentation component 1518 performs the selection. In an aspect, segmentation component 1510 can extract patterns of service usage and identify subscribers in subscriber database 1520 associated with the patterns. Patterns can include at least one of frequency of contracted mobile device upgrade, or rate of engagement in new service offering(s) or adoption of newly offered mobile devices. Segmentation component 1518 can exploit machine-learning techniques for data mining and pattern extraction.

Additionally, promotional planning component 1510 can generate subscriber-specific leasing plan(s), e.g., a lease agreement, which can be offered through the promotional materials. Subscriber specific leasing plan(s) can be customized based at least in part on subscriber intelligence retained in subscriber database 1520. Such customized leasing plan(s) can allow utilization of currently subscribed service units, e.g., voice and data units in service plan contracted with the network operator, towards rental of a mobile device for a specific lease period. To enable such utilization, in the illustrated example system 600, incentive generator component 1514, also referred to as incentive generator 1514, can determine a rate of conversion amongst subscribed and leased service units. Incentive generator 1514 also can determine time interval through which the conversion is valid; the time interval can span a configured lease period. The subscriber-specific plan(s) can be offered through an enrollment fee or without enrollment charges for a predetermined grace period.

A subscriber that engages in leasing program can opt to update a service subscription (which is not a lease agreement) with the leased device. The latter has at least the following advantages for the network operator: (1) collection of rental fee(s), (2) penetration of newer, more capable mobile devices with increased potential for add-on services and associated revenue, and (3) extension of contracted service subscriptions with asset protection based on collection of early termination fees.

To mitigate attrition of lessees or reward lessee loyalty, promotional planning component 1510 can establish leasing incentive(s) based at least in part on at least one of lessee ratings, retained in lessee account(s) 136 (see, e.g., FIG. 3), or lessee intelligence 138. The leasing incentives can include discounted rates or bonus service units, bonus service(s) such as free-of-charge Wi-Fi connectivity in network(s) managed by network operator that administers leasing program, lease grace periods, gratuitous UE accessories, or the like. In the illustrated example embodiment of promotional component 1510, incentive generator 1514 can issue and customize leasing incentive(s) for a particular lessee or a lessee segment; issuance and customization can be accomplished at least in part through machine-learning or artificial intelligence (AI) methods applied to at least one of the lessee ratings or lessee intelligence 138. Promotional planning component 1510 can convey generated incentives for a lessee to registration component 112 (not shown in FIG. 15) within leasing platform 110, which can notify the lessee of available or granted incentives. If the lessee acknowledges available or granted incentives, registration component 112 can receive the acknowledgement, e.g., via signaling 108, and effect the leasing incentives through update of the lessee's service unit banks within service unit storage 142 or lessee's account retained as part of memory element 136. In an aspect, for leasing incentives that comprise bonus service(s) as indicated supra, leasing platform 110 can deliver notification(s) or other information to one or more subsystems (e.g., a portion of service node(s) 140) that enable, at least in part, the bonus service(s), e.g., Wi-Fi access through access points owned or managed by network operator that implements leasing program. The notification(s) can enable provisioning of the bonus service (s), e.g., convey configuration information such as mobile number or other device identifier of a leased device of a lessee who receives the leasing incentives.

For lessee that meets predetermined rating(s) (e.g., retained in eligibility rule(s) 146), promotional planning component 1510 also can generate exclusivity incentives that grant such lessee access to limited release of at least one of novelty mobile device(s), service(s), or radio technology(ies) prior to wide market distribution by the network operator. Through exposure to lessee that enjoys exclusivity incentives, such incentives can increase opportunities to market to consumers, particularly technophiles, of competing network operators with lure of access to limited-release, unique mobile devices. Asset protection mechanisms described supra also apply to such exclusivity promotions that entail delivery of novelty device(s).

In an aspect of the subject innovation, incentive generator component 1514 can exploit AI methods to infer (e.g., reason and draw a conclusion based upon a set of metrics, arguments, or known outcomes in controlled scenarios) a delivery schedule based on historical data on backhaul traffic associated with a femto AP, or any indoor-based AP, or a scan schedule based on quality of service targets related to the femto AP and historical features of service(s) provided by the femto AP. In another aspect, incentive generator component 1514 also can implement AI methods to optimize a utility trade-off between the cost of supplying leasing incentives and the benefit there from in lessee adoption or retention. Promotional planning component 1510 also can select specific devices within a rental pool (not shown in FIG. 15) to be offered under lease terms with incentives. Selection can be based on criteria such as, but not limited to, (i) historical leasing data for the selected devices, e.g., devices for which leases are scarcely renewed; (ii) cost of device acquisition from manufacturer; (iii) device features or capabilities; or (iv) marketplace where device is offered for lease, e.g., areas with substantive deployment of 4G radio technology or legacy radio technology. In an aspect, segmentation component 1518 can select the specific devices based at least in part the AI methods described supra.

Artificial intelligence methods or techniques referred to herein typically apply advanced mathematical algorithms— e.g., decision trees, neural networks, regression analysis, principal component analysis (PCA) for feature and pattern extraction, cluster analysis, genetic algorithm, or reinforced learning—to a data set. In particular, incentive generator 1514 can employ one of numerous methodologies for learning from data and then drawing inferences from the models so constructed. Such methodologies can be retained in memory element 1530. As an example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited.

In view of the example systems described above, example methods that can be implemented in accordance with the disclosed subject matter can be better appreciated with reference to flowcharts in FIGS. 16-26. For purposes of simplicity of explanation, methods disclosed herein are presented and described as a series of acts; however, it is to be understood and appreciated that the disclosed subject matter is not limited by the order of acts, as some acts may occur in different orders and/or concurrently with other acts from that shown and described herein. For example, one or more methods disclosed herein could alternatively be represented as a series of interrelated states or events, such as in a state diagram. Moreover, interaction diagram(s) may represent one or more methods described herein in accordance with the disclosed subject matter when disparate entities enact disparate portions of the one or more methods. Furthermore, not all illustrated acts may be required to implement a described method in accordance with the subject specification. Further yet, two or more of the disclosed methods can be implemented in combination, to accomplish one or more features or advantages herein described.

Methods disclosed throughout the subject specification and annexed drawings are capable of being stored on an article of manufacture to facilitate transporting and transferring such methodologies to computers for execution, and thus implementation, by a processor or for storage in a memory. In an aspect, one or more processors that enact method(s) described herein can be employed to execute code instructions retained in a memory, or any computer- or machine-readable medium, to implement method(s) described herein; the code instructions, when executed by the one or more processor implement or carry out the various acts in the method(s) described herein. The code instructions provide a computer- or machine-executable framework to enact the method(s) described herein.

Figure 16:
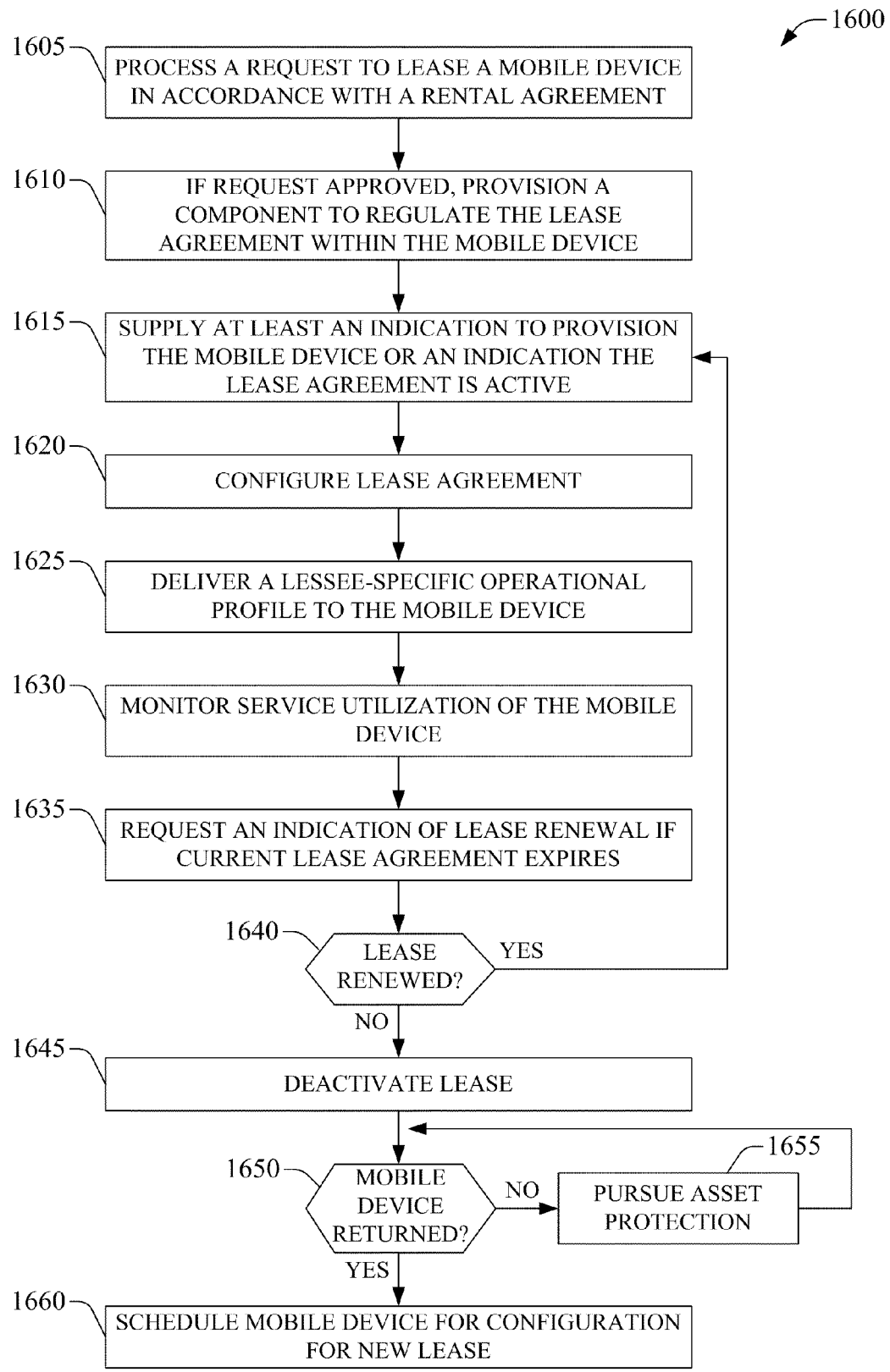
FIG. 16 displays a flowchart of an example method supplying a mobile device through a lease agreement according to aspects described herein.

FIG. 16 displays a flowchart of an example method 1600 supplying a mobile device through a rental agreement according to aspects described herein. The subject example method can be implemented by one or more network functional elements, e.g., leasing platform 110 and components therein. Alternatively or additionally, processor(s) configured to provide or that provides, at least in part, functionality to the one or more network functional elements can enact the subject example method 1600. At act 1605, a request to lease a mobile device in accordance with a lease agreement is processed. Lease agreement includes at least one of rental period or retained volume of leased service units, e.g., voice minutes or data units such as MBs. At act 1610, if the request is approved, a component (e.g., leasing client component 625) to regulate a lease agreement within the mobile device is provisioned. At act 1615, at least one of an indication to provision the mobile device or an indication the lease is active is supplied. At act 1620, a lease agreement is configured. Configuration proceeds, at least in part, as described supra. At act 1625, a lessee-specific operational profile is delivered to the mobile device. Based on the type of lease, e.g., a new lease or a renewal lease, the operational profile can be automatically generated or retrieved from mass storage, or other type of memory, as part of leasing the mobile device. As indicated supra, e.g., in description of profile(s) 320, an operational profile can include information that facilitates or enables, at least in part, operation of leased mobile device.

At act 1630, service utilization of the mobile device is monitored. Monitoring act can determine at least one of consumption of leased service units or expiration of lease terms. In addition, the monitoring act can retain call session records and at least a portion of call session traffic for compliance with law enforcement regulation(s), such as the Communications Assistance for Law Enforcement Act (CALEA). In an example embodiment of the subject example method, at least one of billing component 114 or tracking component 118 can implement, at least in part, the subject act. At act 1635, an indication of lease renewal is requested if the current lease agreement expires.

At act 1640 it is determined if a lease agreement is renewed. A determination that the lease agreement is renewed can be effected based at least in part on receiving an acknowledgement of the request and a subsequent lease renewal message. Conversely, a determination that the lease is not renewed can be based at least in part on receiving an acknowledgement of the request and a subsequent non-renewal message. Alternatively, if a non-renewal message is not received within a predetermined period after acknowledgement, the lease is deemed not renewed. Such determination(s) can include a retry cycle, or loop, including Q (a natural number) attempts to receive acknowledgement of the request for an indication of lease renewal. If lease is renewed, flow is directed to act 1615; conversely, flow is directed to act 1645 in which the lease is deactivated. In an aspect, as part of lease deactivation, a retention protocol for lease account and lessee intelligence can be implemented.

At act 1650 it is probed if the mobile device has been returned. In the negative case, asset protection is pursued at act 1655. Asset protection includes polling a current or substantially current location of the mobile device, wherein the polling comprises at least one of requesting a GPS-based location estimate if the mobile device can manipulate GPS navigation data; requesting a location estimate based at least in part on TOF measurements; or extracting a location estimate based at least in part on attachment signaling to a femtocell AP and location data retained for the femtocell AP. Conversely, the mobile device is scheduled for configuration for a new lease at act 1660.

Figure 17:
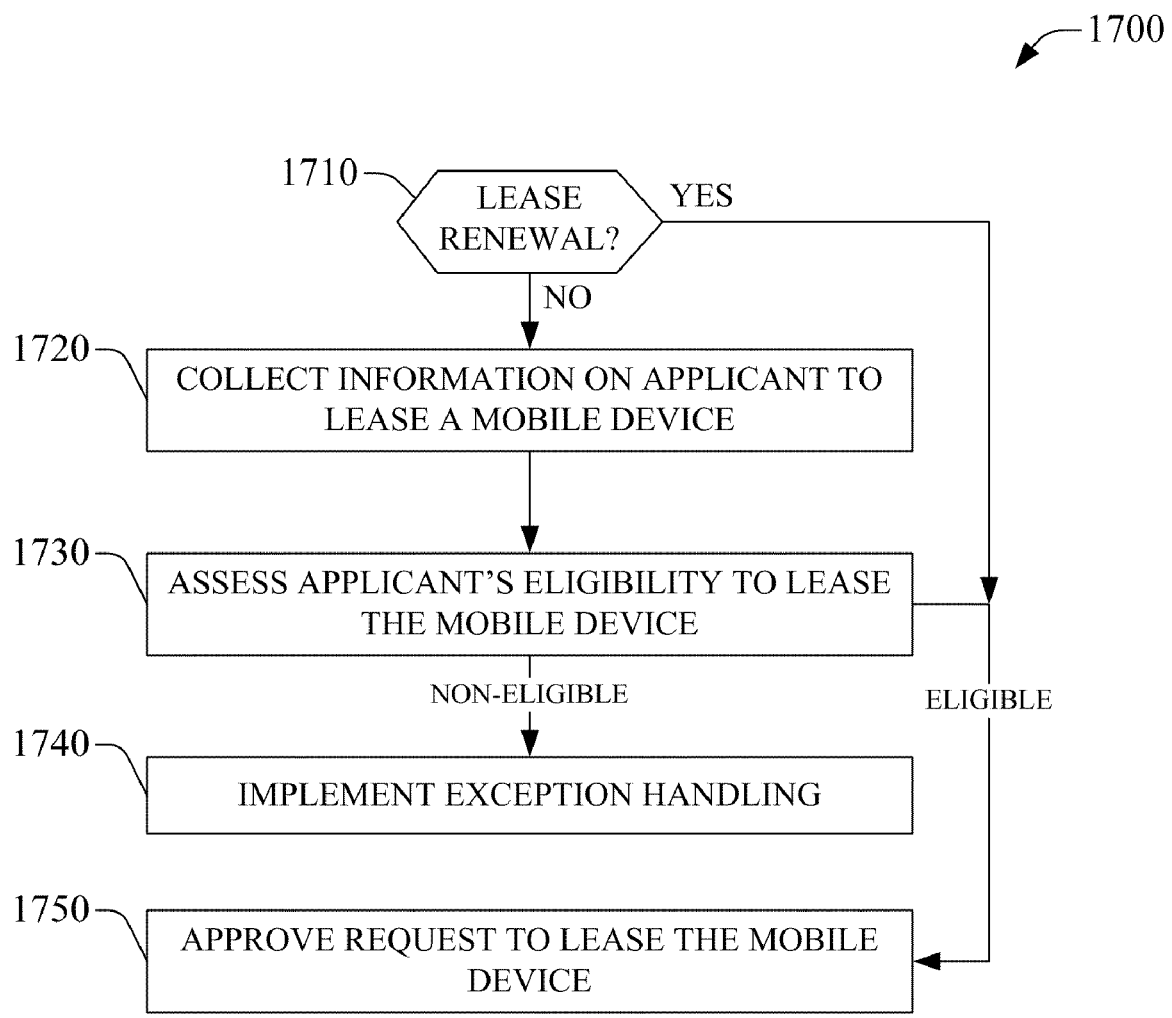
FIG. 17 displays a flowchart of an example method for leasing a mobile device in accordance with aspects described herein.

FIG. 17 displays a flowchart of an example method 1700 for leasing a mobile device in accordance with aspects described herein. The subject example method can be at least a part of act 1210, and can be effected by one or more network components, e.g., registration component 112 or billing component 114. A field deployed system or component, e.g., rental system POL terminal 155 or component(s) therein, also can implement at least part of the subject. Alternatively or additionally, processor(s) configured to provide or that provides, at least in part, functionality to the one or more network functional elements can enact the subject example method 1700. At act 1710 it is probed if a renewal lease is effected. In the negative case, information on applicant to lease a mobile device is collected at act 1720. As described supra, information includes at least one of selected mobile device; selected volume of service units; billing information; commercial identifier(s); or other information conventionally requested in a commercial transaction. Moreover, the information can include data on wireless services retained by the applicant; the services provided by the network operator that administers the lease of mobile device(s) or by a competing telecommunication carrier. At act 1730, applicant's eligibility to lease the mobile device is assessed. The assessment can be based at least in part on at least a portion of the collected information, and a set of eligibility rules that determine, at least in part, commercial risk(s) associated with applicant, as described above. The set of eligibility rules can be specific to a network operator and thus can avoid reliance on conventional creditworthiness ratings to establish applicant's eligibility or non-eligibility. In an aspect, registration component 112, or sub-component therein, can apply one or more eligibility rules and generate an eligibility assessment of applicant. If an applicant is non-eligible, exception handling is implemented at act 1740. Exception handling can include supplying a copy of applicant assessment and reason(s) application was declined. Additionally or alternatively, exception handling can include providing a set of one or more mobile devices that the applicant is eligible to rent. Exception handling also can include conveying promotional material that recommends subscription to a non-lease wireless service program that qualifies for participation on leasing plan(s) of mobile devices. In the alternative, if the applicant is eligible, a request to lease the mobile device is approved at act 1750. An affirmative outcome to act 1710 also leads to act 1750.

At act 1760, an indication to provision the mobile device is supplied. Such indication can be conveyed to a wireless service network platform to at least one of (i) assign or commit a mobile number to the mobile device; or (ii) initiate one or more services that enable operation of the mobile device—e.g., call session establishment, authorization, authentication and accounting (AAA) services, access to add-on service(s) such as wireless IPTV broadcast(s), satellite-based radio content, web-browsing parental controls, etc. In an aspect, registration component 112 can assign the mobile number to the mobile device and supply such number as part of the provisioning indication.

Figure 18:
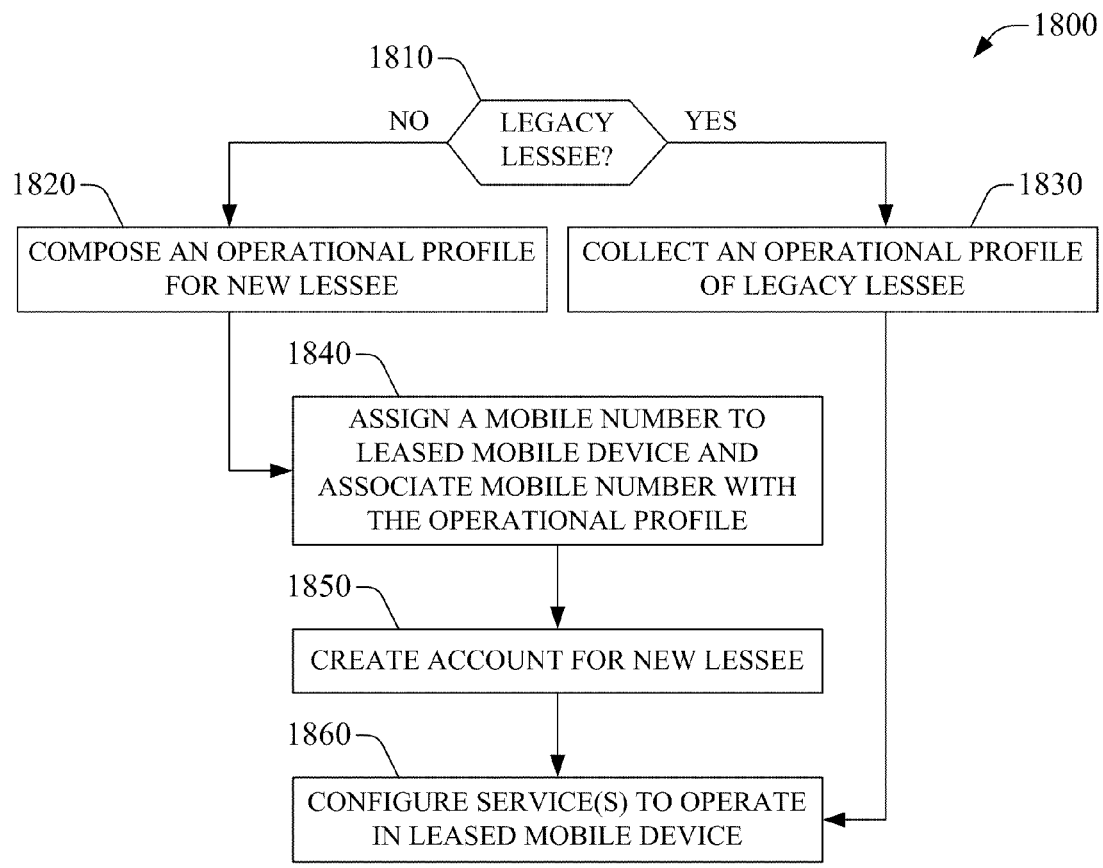
FIG. 18 displays a flowchart of an example method for configuring a lease agreement according to aspects of the subject disclosure.

FIG. 18 displays a flowchart of an example method 1800 for configuring a lease agreement according to aspects of the subject disclosure. At act 1810, it is determined if a lessee is a legacy lessee. In the affirmative case, an operation profile of legacy lessee is collected at act 1830. Conversely, an operational profile for new lessee is composed at act 1820; composition of the operational profile of the new lessee can be based at least in part on information (e.g., demographics, retained service, wireless or otherwise . . . ) collected at a time of configuring a lease agreement. At act 1840, a mobile number is assigned to leased mobile device and the assigned mobile number is assigned to the operational profile. At act 1850, an account, e.g., account 300, is created for new lessee. At act 1860, service(s) to operate, or consume, in the leased device are configured.

Figure 19:
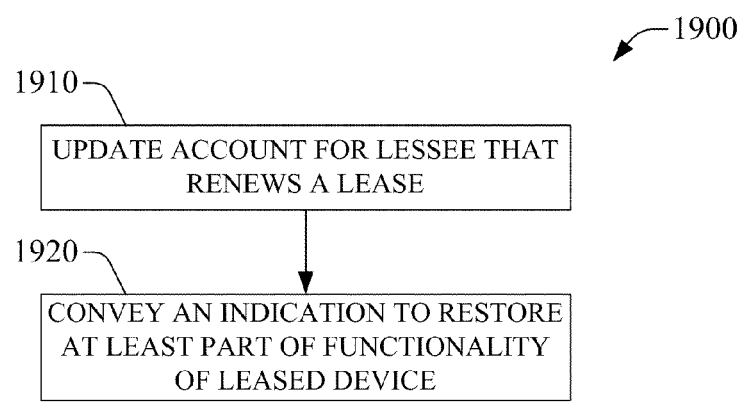
FIG. 19 presents a flowchart of an example method for processing a lease agreement according to aspects described herein.

FIG. 19 presents a flowchart of an example method 1900 for configuring a lease agreement according to aspects described herein. The subject example method 1900 can be performed as part of act 1350 in case an existing lessee renews lease of a mobile device. The one or more network functional elements that effect act 1340 can carry out the subject example method 1900. At act 1910, an account for a lessee that renews a lease is updated. Update can include configuration of service unit record(s) (e.g., within memory element 689) in accordance with received updated attributes for airtime or volume of data retained as part of lease renewal—such attributes can be received as part of signaling 108—, or recordation of an updated operational profile. Update also can include at least one of revision of lessee rating, recordation of service flag(s), e.g., base services or add-on, secured as part of lease renewal, or modification to billing record(s). At act 1920, an indication to restore at least part of functionality of leased device is conveyed, wherein the functionality that is restored had been locked as part of termination of a former lease agreement.

Figure 20:
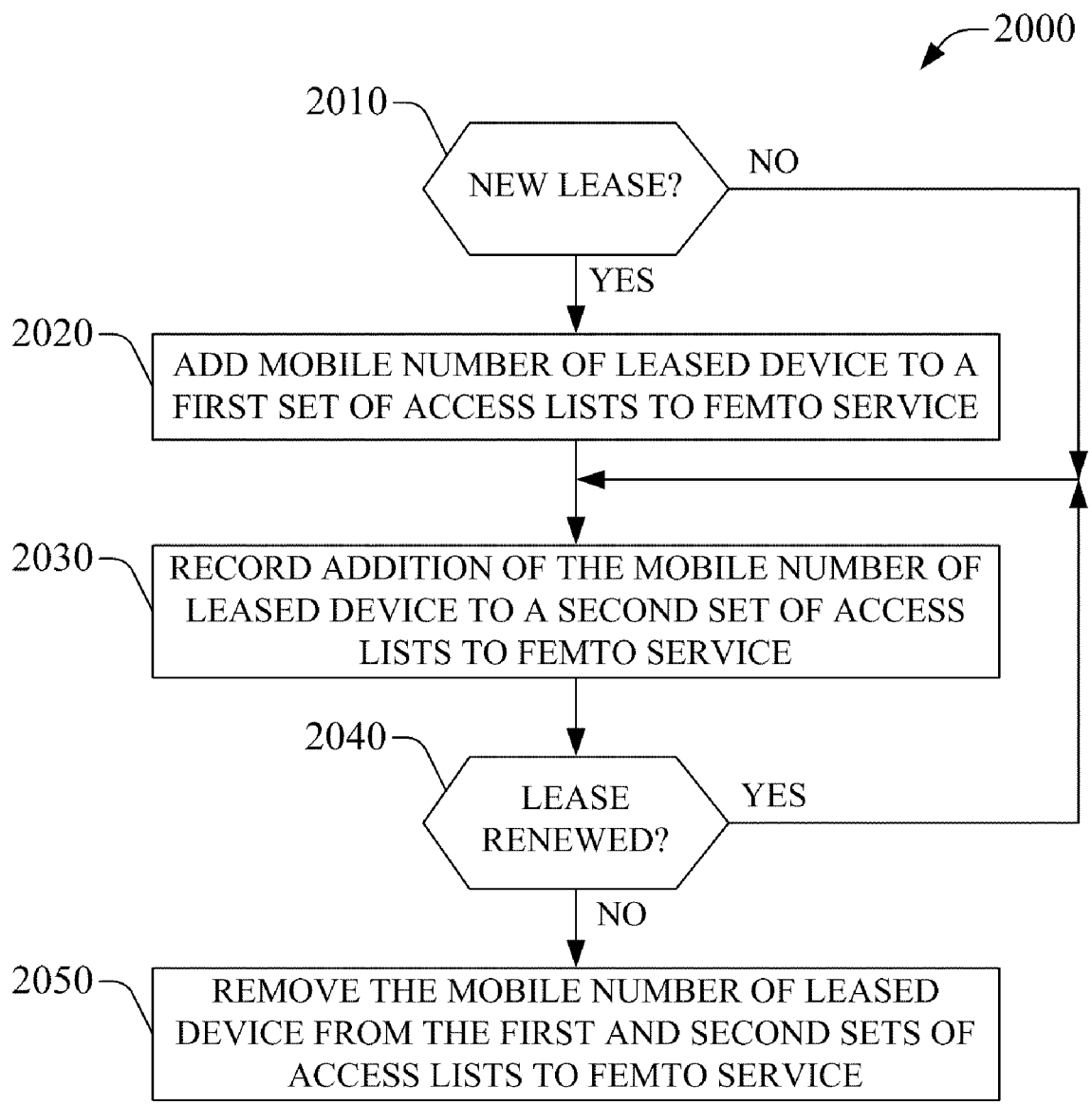
FIG. 20 displays a flowchart of an example method for configuring a group of access lists to femtocell service in accordance with aspects described herein.

FIG. 20 displays a flowchart of an example method 2000 for configuring a group of access lists to femtocell service in accordance with aspects described herein. Access list(s) can be residential access list(s) or enterprise access list(s), wherein enterprise access list(s) include one or more access lists configured for femto APs deployed in customer service premises, e.g., point of lease (POL) terminal(s), of a telecommunication carrier that administers the mobile device leasing program. One or more network components, e.g., access list management component 1410, can effect the subject example method 2000. Additionally or alternatively, one or more processor(s) configured to provide or that provide at least part of the functionality of the one or more network components also can implement the subject example method 2000.

At act 2010, it is evaluated if a lease is a new lease. In an aspect, a new lease is associated with a newly leased mobile device even though a lessee can be a legacy lessee. In the affirmative outcome, at act 2020, mobile number of leased device is added to a first set of access lists to femtocell service. At act 2030, addition of the mobile number of leased device to a second set of access lists to femtocell service is recorded. For a new lease, the mobile number that is recorded corresponds to a newly leased device. The recording act includes monitoring changes to extant access lists for subscriber(s) of network operator that administers the mobile device leasing program. A negative outcome of act 2010 leads to act 2030; however, the mobile number that is recorded in the second set of access lists corresponds to a currently leased mobile device. At act 2040, it is determined if a lease is renewed. In the affirmative case, flow is directed to act 2030.

Figure 21A:
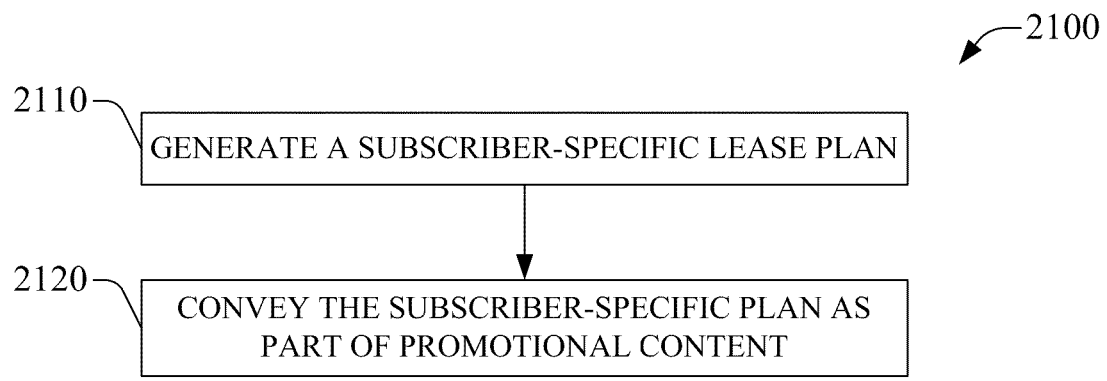
FIGS. 21A-21B display flowcharts of example methods for developing a leasing program or aspects thereof on a promotional basis in accordance with aspects described herein.
Figure 21B:
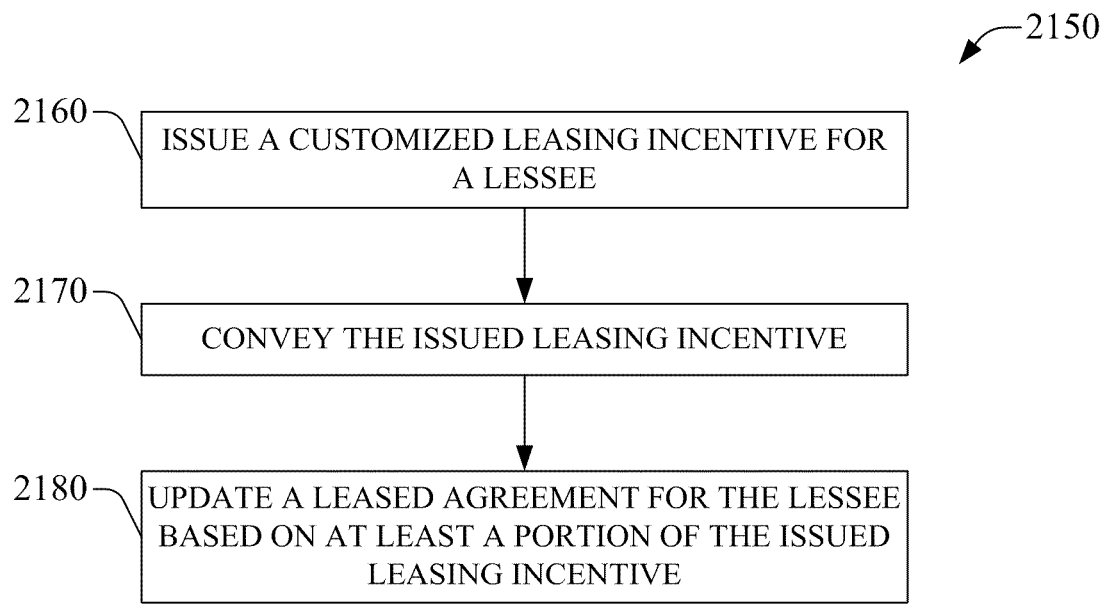

FIGS. 21A-21B display flowcharts of example methods for developing a leasing program or aspects thereof on a promotional basis. One or more network components, e.g., promotional planning component 1510, can enact example method 2100 or 2300. Additionally or alternatively, one or more processor(s) configured to provide or that provide at least part of the functionality of the one or more network components also can implement example method 2100 or 2300. FIG. 21A presents a flowchart of example method 2100 for developing adoption of leasing program amongst subscribers of network operator that manages the program according to aspects described herein. At act 2110, a subscriber-specific lease plan is generated. Subscribers for which a custom lease program is generated can be targeted based at least in part on various available subscriber information such as, but not limited to, subscribed service(s) and usage thereof; length of subscription; type of subscriber, e.g., business or residential; or the like. The generated lease plan can allow a subscriber-specific volume of subscribed voice and data service units to be utilized for operation of a leased mobile device. For data service units, the subscriber-specific lease plan can determined particular service(s) that can consume subscribed service units. Additionally or alternatively, the generated lease plan can establish a subscriber-specific rate of conversion of subscribed service units into leased service units. At act 2120, the subscriber-specific plan is conveyed as part of promotional content.

FIG. 21B displays a flowchart of example method 2150 for mitigating attrition of current lessees according to aspects described herein. At act 2160, a customized leasing incentive for a lessee is issued. Customization can be based at least in part on at least one of lessee rating or lessee information. At act 2170, the issued leasing incentive is conveyed. In an aspect, the lessee is notified of granted or available leasing incentive(s). At act 2180, a leased agreement for the lessee is updated based on at least a portion of the issued leasing incentive. For leasing incentives that comprise bonus service (s) for duration of a lease of a mobile device, updating the lease agreement for the lessee can include delivering notification(s) or other information to one or more subsystems that enable, at least in part, the bonus service(s), e.g., Wi-Fi access through access points owned or managed by network operator that implements leasing program. The notification(s) or information can be associated with the leased mobile device and can enable provisioning of the bonus service(s) for the lessee.

Figure 22:
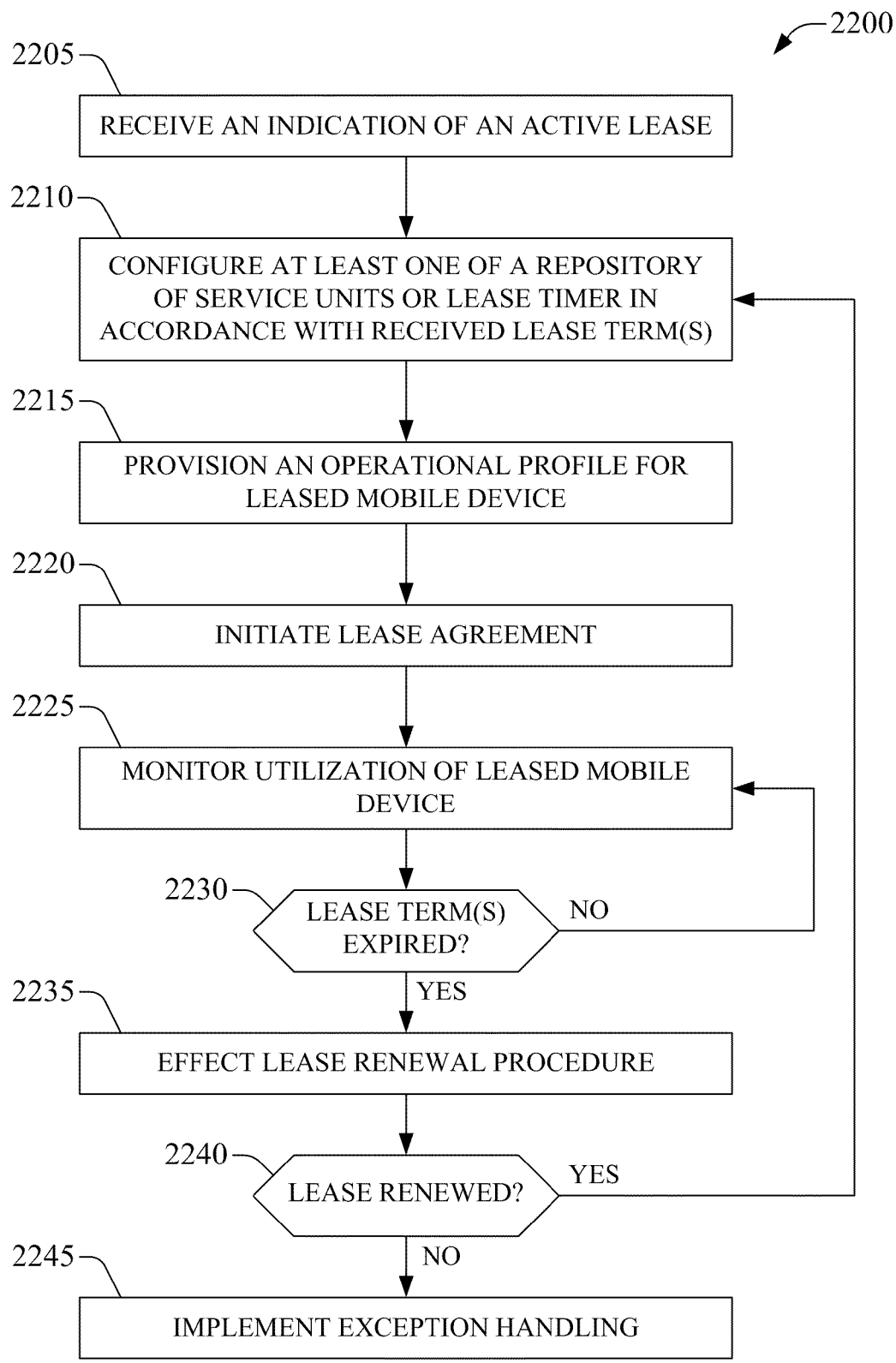
FIG. 22 presents a flowchart of an example method for operating a mobile device under a lease agreement according to aspects described herein.

FIG. 22 presents a flowchart of an example method 2200 for operating a mobile device under a lease agreement according to aspects described herein. The mobile device, or one or more components therein, can enact the subject example method 2200. Additionally or alternatively, processor(s) configured to provide or that provides at least part of the wireless device functionality also can effect the subject example method 2200. At act 2205, an indication of an active lease is received. The indication can be received through signaling delivered through an access network, e.g., a femtocell network backhaul pipe; signaling can be embodied, for example, in at least one of a short message service (SMS) communication, an unstructured supplementary service data (USSD) message, or a set of bits delivered in a control channel), data packet header(s), management frame(s), or management packet(s). At act 2210, at least one of a repository of service unit(s) or lease timer is configured, e.g., generated and persisted in memory, in accordance with received lease term(s), which can include at least one of agreed rental period and leased service unit(s). In an aspect, the lease term(s) can be received subsequent to delivery of an acknowledgement (ACK) signal to the received indication of active lease. At act 2215, an operational profile for leased mobile device is provisioned. In an aspect, the provisioned operational profile is specific to the lessee of the mobile device. At act 2220, lease agreement is initiated.

At act 2225, utilization of the leased mobile device is monitored. Monitoring can be accomplished by polling at least one of the lease timer or a data cache that records airtime and received or transmitted data in a call session. To ensure monitoring integrity, the monitoring act can include reconciling leased service usage with service consumption information retained within a serving network, e.g., a network that includes leasing platform 110 and component(s) therein. Monitoring also can include rendering message(s) to convey an appraisal of lease utilization. As an example, the message(s) can be embodied in aural of visual indicia in a user interface, e.g., actor-machine interface 645, which is part of the mobile device that enacts the subject example method. As another example, the message(s) can be supplied via wireless communication to a wireless-enabled device, which can render the message(s).

At act 2230, it is probed if lease term(s) are expired; for instance, one or more repositories of leased service units are exhausted. In the negative case, flow is directed to act 2225 for further monitoring of utilization of the leased mobile device. In the affirmative case, a lease renewal procedure is effected at act 2235. At act 2240, it is established if the lease is renewed. To establish lease renewal, signaling originating as part of act 2235 can be analyzed. In the absence of lease renewal, exception handling is implemented at act 2245. Exception handling can include, for example, producing a location estimate of the mobile device, issuing a notification to return same, and conveying the notification. If lease is renewed, flow is directed to act 2210. While illustrated for a mobile device, the subject example method 2200 can be exploited for substantially any device with wireless capabilities, particularly those devices that operate within a coverage area of femtocell service.

Figure 23:
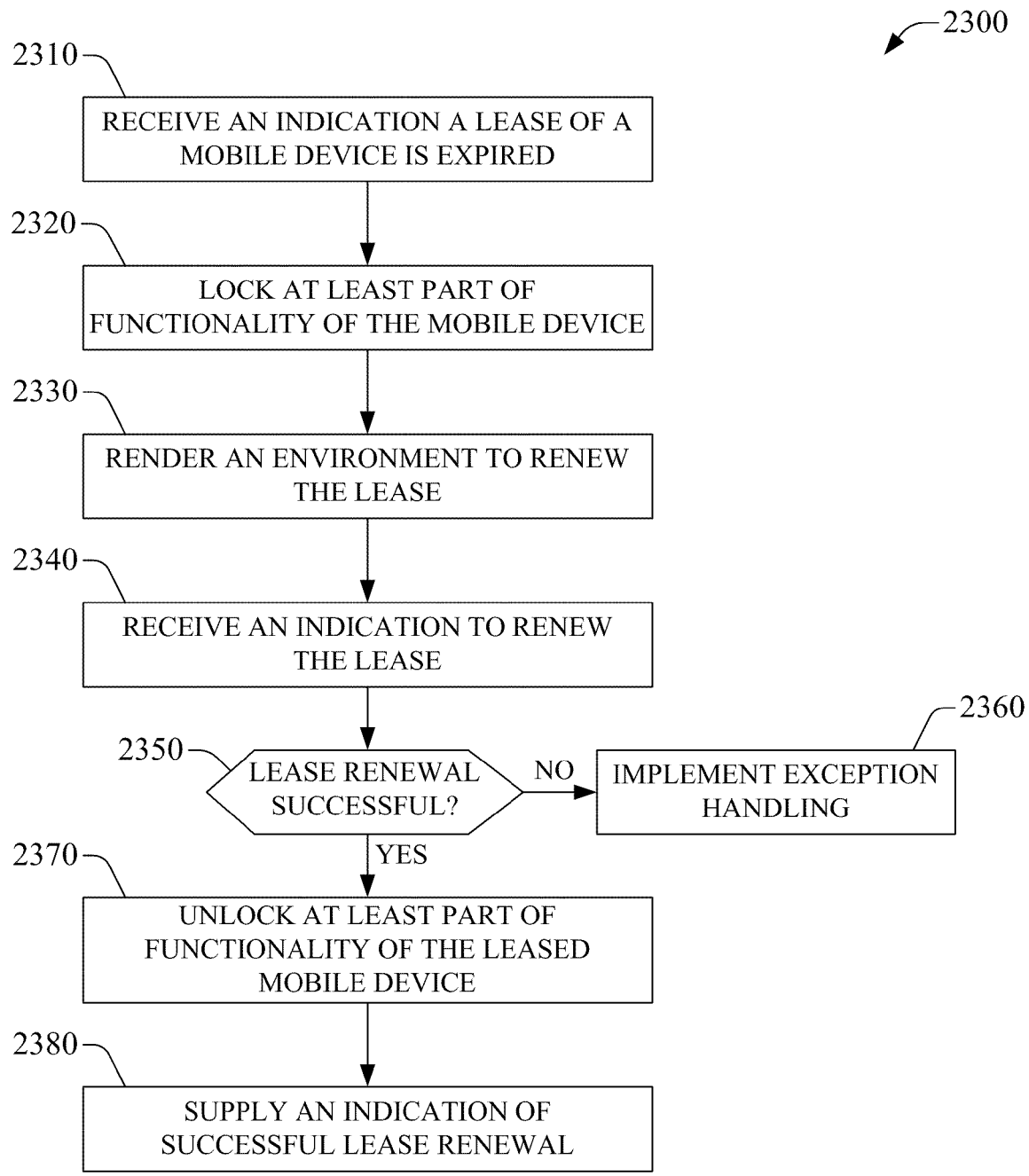
FIG. 23 is a flowchart of an example method that embodies a lease renewal procedure according to aspects of the subject disclosure.

FIG. 23 is a flowchart of an example method 2300 that embodies a lease renewal procedure according to aspects of the subject disclosure. The subject example method 2300 can be carried out as part of act 2235 by a device, e.g., mobile device 602, or component(s) therein, that implements example method 2200. Additionally or alternatively, processor(s) configured to provide or that provides at least part of the device functionality also can effect the subject example method 2300. At act 2310, an indication that a lease of a mobile device is expired is received. Receiving the indication can include decoding one or more messages that embody such indication. At act 2320, at least part of functionality of the mobile device are locked. Consumer applications such as media player(s), voice communication including macrocellular femtocell delivery, push-to-talk, Wi-Fi access, or the like, are deactivated. However, emergency calling, e.g., access to E911 service, and associated applications such as generation of GPS location fixes remain functional. Component(s) that enable implementation of the subject example method also remain functional. The locking act the expiration of a lease period includes controlling each of the functional aspects of the mobile device that are disabled. Control of such aspects can be granted by mobile device manufacturer to network operator(s) that provision operation of a mobile device under a lease agreement in accordance with aspects described herein.

At act 2330, an environment to renew the lease is rendered. Rendition can include at least one of visual or aural indicia conveyed through a user interface, e.g., actor-machine interface 645. In an aspect, the environment can include various voice- or image-controlled menus to facilitate or enable lease renewal. At act 2340, an indication to renew the lease is received. The indication can be a message embodied in a set of one or more bits, which can be retained in memory or decoded to effect the indication. At act 2350, it is determined if lease renewal is successful. In the negative case, exception handling is implemented at act 2360. Exception handling can include a notification conveying reason(s) renewal was not completed. In addition, exception handling can include supplying an indication of unsuccessful lease renewal. In the affirmative case, at least part of the functionality of the leased mobile device is unlocked at act 2370. At act 2380, an indication of successful renewal is supplied. Supplying the indication can include generating a message that embodies the indication and delivering such message.

Figure 24A:
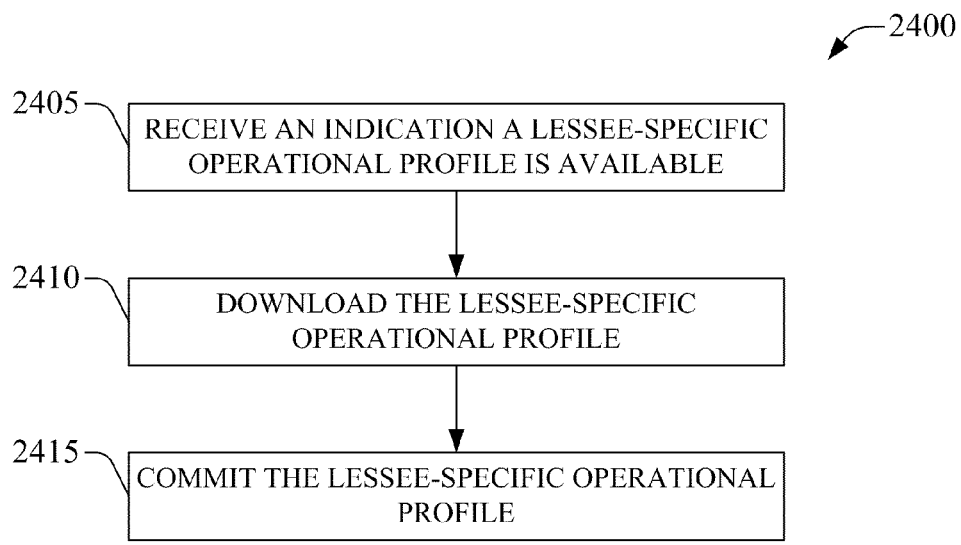
FIGS. 24A-24B display flowcharts of example methods for configuring a lessee-specific operational profile according to aspects described herein.
Figure 24B:
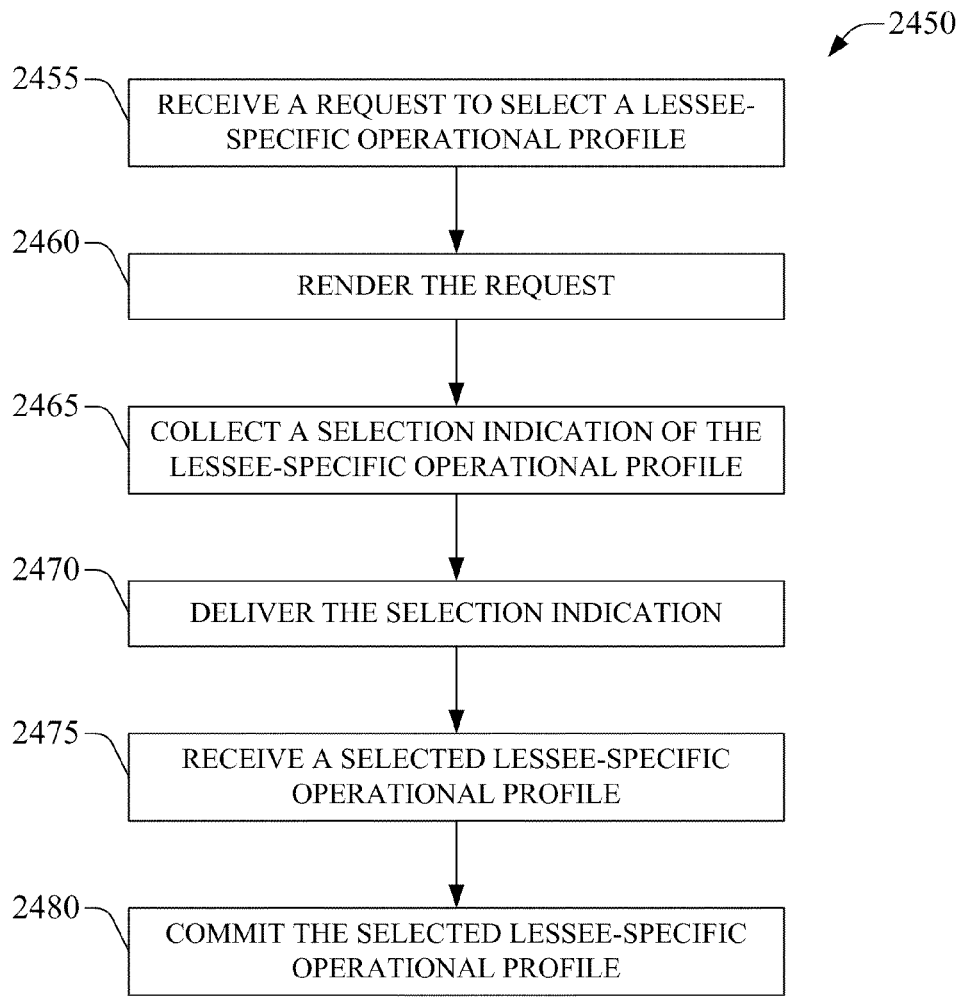
Figure 25:
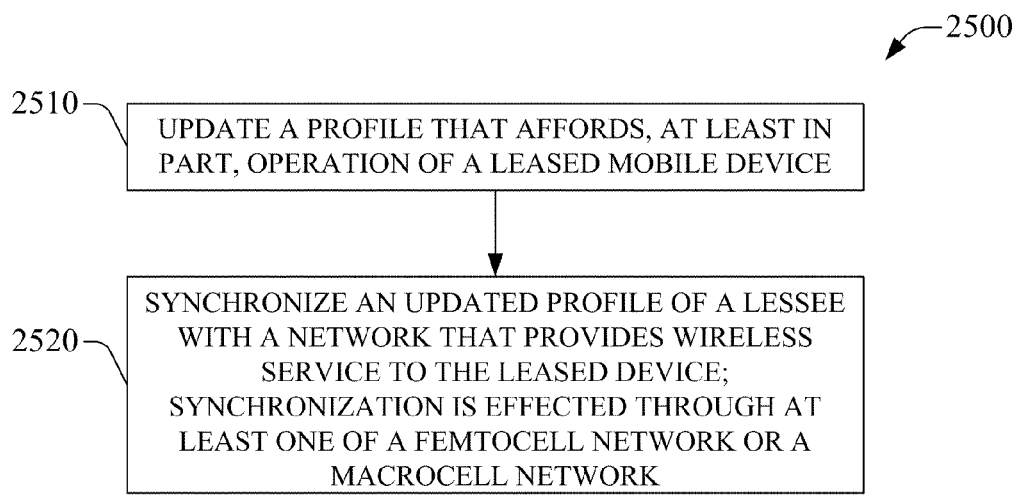
FIG. 25 presents a flowchart of an example method for maintaining a current or substantially current operational profile at the network level according to aspects described herein.

FIGS. 24A and 24B display flowcharts of example methods 2400 and 2450, respectively, for configuring a lessee-specific operational profile according to aspects described herein. Configuration of the operational profile is automatic. A leased device with wireless communication functionality, or one or more components therein, can effect example methods 2400 and 2450. Additionally or alternatively, processor(s) configured to provide or that provides at least part of the leased device functionality also can implement the subject example methods. In an aspect, example methods 2400 and 2450 can be enacted in conjunction with or as part of example method 2200. At act 2405, an indication that a lessee-specific operational profile is available is received. As in previously described example methods, receiving the indication can include decoding one or more messages that embody such indication. At act 2410, the lessee-specific operational profile is downloaded. Downloading can include at least the following: acknowledging the received indication and collecting the lessee-specific operational profile. At act 2415, the lessee-specific operational device is committed. Committing act includes at least one of storing the profile in memory or synchronizing the profile with a serving network or a client network. Synchronization ensures updates performed to the stored profile are conveyed to the serving network.

With respect to FIG. 24B, at act 2455, a request to select a lessee-specific operational profile is received. Such request can be received as part of an indication of availability of operational profile(s) and is typically received by legacy lessee(s). At act 2460, the request is rendered. The device that implements the subject example method can render the request through a user interface, e.g., actor-machine interface 645, via visual or aural indicia. At act 2465, a selection indication of the lessee-specific operational profile is collected. The selection indication can be received through at least one of the user interface, e.g., via a data entry interface and associated user gestures (e.g., touch, speech, motion). At act 2470, the selection indication is delivered. Delivery can include coding of the indication according to at least one of a communication protocol or format. The selection indication can be delivered to a network that administers, at least in part, leasing of mobile device(s) or device(s) with wireless capabilities. At act 2475, a selected lessee-specific operational profile is received. The profile can be received in various formats (e.g., an XML file or variants thereof) according to specific communication or delivery protocol (e.g., FFTP, SFTP, FTPS, SMS protocol, MMS protocol, USSD standard, SNMP, or the like . . . ). At act 2480, the selected lessee-specific operational profile is committed. Committing can be implemented in the same manner as in act 2415.

Provisioned operational profiles described herein can evolve due to utilization of the leased device and as a result of a lessee becoming familiar with the lease device capabilities. The subject innovation provides for maintaining a current or substantially current operational profile at the network level, as illustrated in example method in FIG. 25. In example method 2500, at act 2510, a profile that affords, at least in part, operation of a leased mobile device is updated. A dedicated component within the leased mobile device, e.g., profile manager 635, can perform the update. At act 2520, an updated profile of a lessee is synchronized with a network that provides wireless service to the leased device. Synchronization can be performed through at least one of a femtocell network or a macrocell network. It should be appreciated that other indoor-based APs (e.g., Wi-Fi base station, picocell AP . . . ) and associated networks also can be exploited. As indicated supra, predetermined criteria, e.g., synchronization criteria, can establish conditions to select one of the two networks; such criteria can include one or more thresholds on profile size and available network resources. Example method 2500 can be enacted, at least in part, by a mobile device and network component(s) that can enable synchronization with at least one of a serving network or an external network.

Figure 26A:
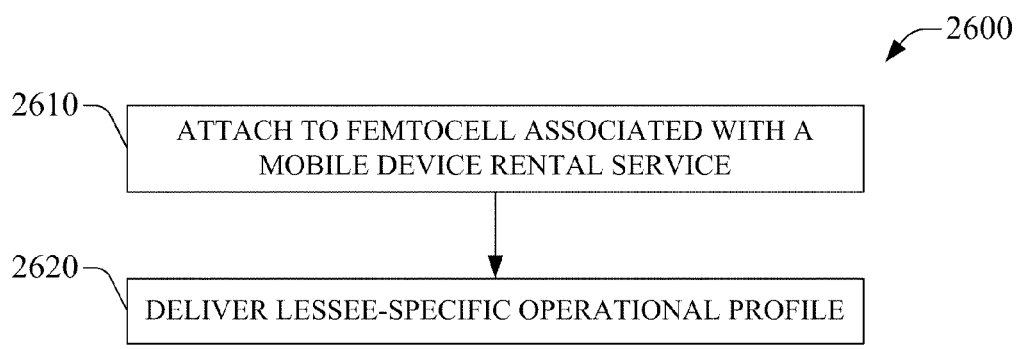
FIGS. 26A-26B are flowcharts of example methods for synchronizing an operational profile with a serving network through a femtocell network according to aspects described herein.
Figure 26B:
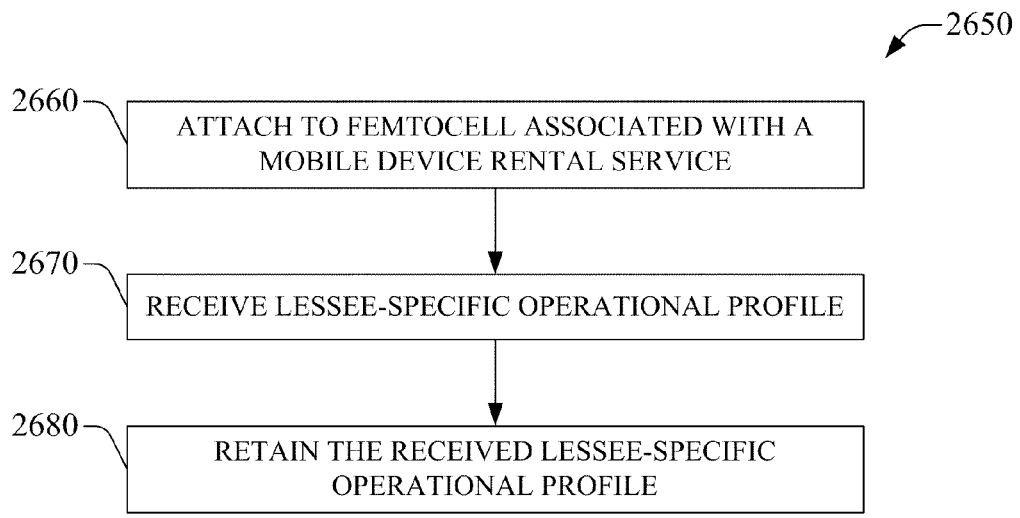

FIGS. 26A-26B are flowcharts of example methods 2600 and 2650, respectively, that illustrate synchronization of an operational profile with a serving network through a femtocell network according to aspects described herein. The subject example methods can be carried out as part of act 2020. Example method 2600 can be implemented for synchronization of profile updates originated at leased device. At act 2610, attachment to femtocell associated with a mobile device rental service is effectuated. Such femtocell can be deployed within a POL terminal or environment (see, e.g., FIG. 1), as described above. At act 2620, a lessee-specific operational profile is delivered. Synchronization of updates to an operational profile that originates at the network level, for example, in a serving network or received at the serving network from an external network, can be accomplished through implementation of example method 2650. At act 2660, attachment to femtocell associated with a mobile device rental service is effectuated. At act 2670, a lessee-specific operational profile is received. At act 2680, the received lessee-specific operational profile is retained; e.g., in a memory within a leased mobile device that receives the profile.

Figure 27:
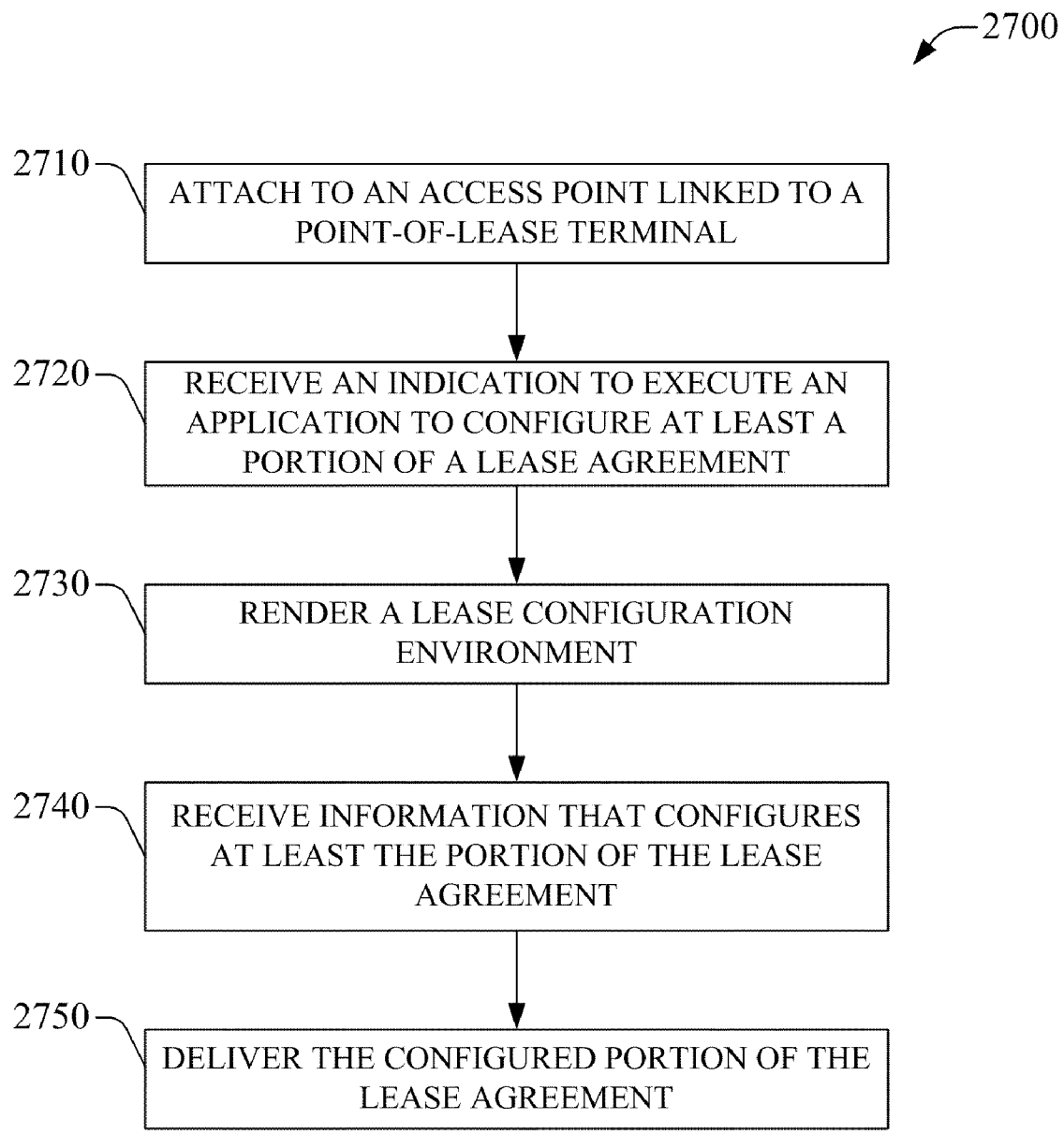
FIG. 27 is a flowchart of an example method for configuring at least a portion of a lease agreement according to aspects described herein.

FIG. 27 presents a flowchart of an example method 2700 for configuring at least a portion of a lease agreement according to aspects described herein. A mobile device that is being leased, or one or more components therein, can enact the subject example method 2700. Additionally or alternatively, processor(s) configured to provide or that provides at least part of the wireless device functionality also can effect the subject example method 2700. At act 2710, attachment to an access point, e.g., a femtocell AP, linked to a POL terminal is performed. The mobile device that enacts the subject example method delivers attachment signaling that enable at least part of the attachment to the access point. At act 2720, an indication to execute an application to configure at least a portion of a lease agreement. In an aspect, the application can be retained in application storage, e.g., 691, within the mobile device that enacts the subject example method. The indication can be a SMS control communication delivered by the access point. At act 2730, a lease configuration environment is rendered, the environment can include various user interfaces (e.g., 1100, 1200) that allow input of information related to a lease agreement, such as leased service units for voice or data. At act 2740, information that configures at least the portion of the lease agreement is received. At act 2750, the configured portion of the lease agreement is delivered. Delivery can be performed towards the access point, which relays the information to a leasing platform, e.g., 110, through an access network, e.g., 153.

Figure 28:
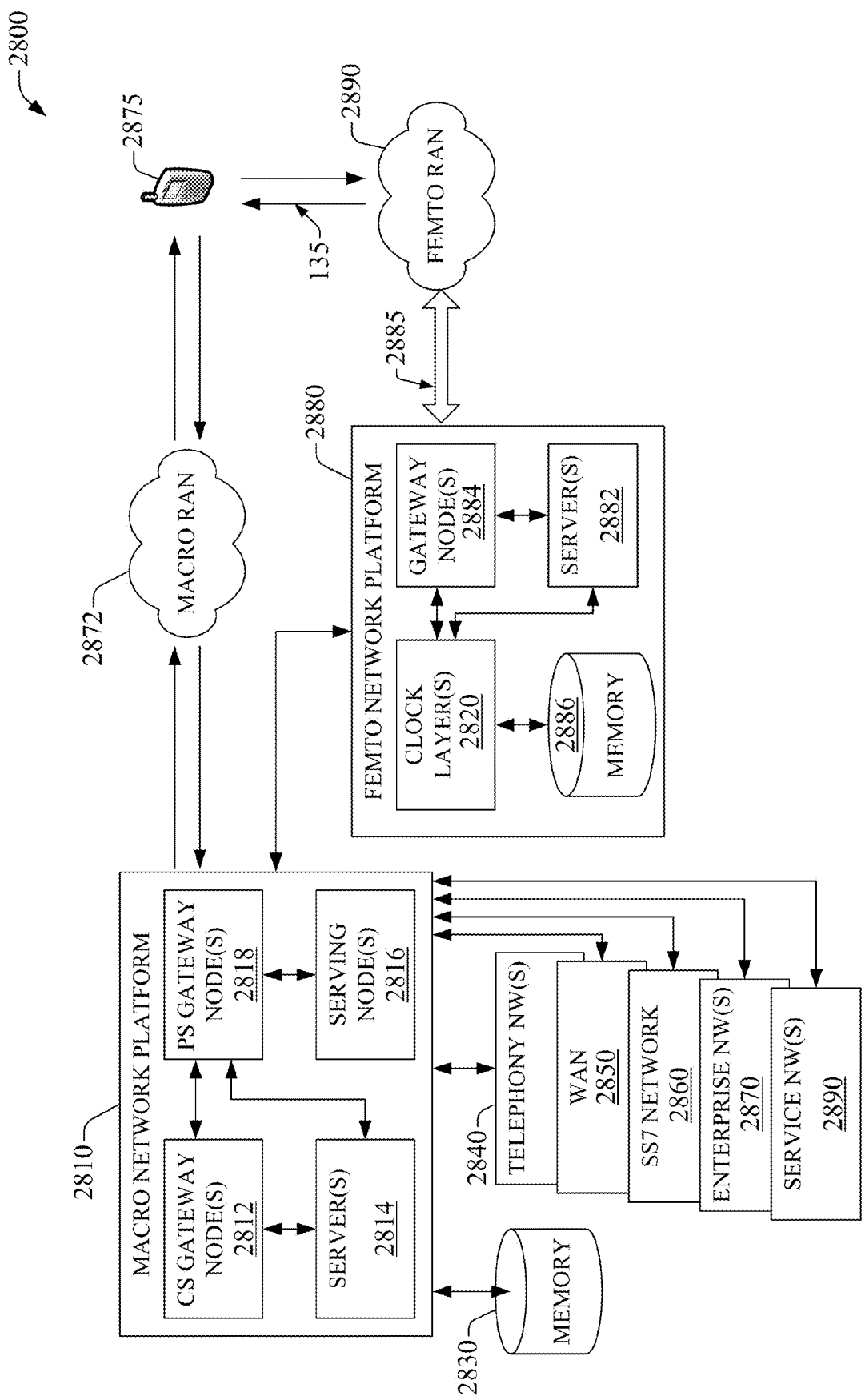
FIG. 28 illustrates and example wireless network environment that includes femtocell and macrocell platforms, which can embody at least in part an access network, and that can enable aspects or features described herein.

To provide further context for various aspects of the subject specification, FIG. 28 illustrates and example wireless network environment 2800 that includes femtocell and macrocell platforms, which can embody at least in part access network 153, and that can enable aspects or features described herein. Wireless communication environment 2800 includes two wireless network platforms: (i) A macro network platform 2810 which serves, or facilitates communication with user equipment 2875 (e.g., mobile 120$_A$) via a macro radio access network (RAN) 2870. It should be appreciated that in cellular wireless technologies (e.g., 3GPP UMTS, HSPA, 3GPP LTE, 3GPP UMTS, 3GPP2 UMB), macro network platform 2810 is embodied in a Core Network. (ii) A femto network platform 2880, which can provide communication with mobile 2875 through a femto RAN 2890, which is linked to the femto network platform 2880 via backhaul pipe(s) 2885 (e.g., backhaul link(s) 153). It should be appreciated that macro network platform 2810 typically hands off UE 2875 to femto network platform 2810 once UE 2875 attaches (e.g., through macro-to-femto handover) to femto RAN 2890, which includes a set of deployed femto APs (e.g., femto AP 130) that can operate in accordance with aspects described herein.

It is noted that RAN includes base station(s), or access point(s), and its associated electronic circuitry and deployment site(s), in addition to a wireless radio link operated in accordance with the base station(s). Accordingly, macro RAN 2870 can comprise various coverage cells like cell 105, while femto RAN 2890 can comprise multiple femtocell access points such as femto AP 130. Deployment density in femto RAN 2890 is substantially higher than in macro RAN 2870.

Generally, both macro and femto network platforms 2810 and 2880 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 2810 includes CS gateway node(s) 2812 which can interface CS traffic received from legacy networks like telephony network(s) 2840 (e.g., public switched telephone network (PSTN), or public land mobile network (PLMN)) or a SS7 (signaling system #7) network 2860. Circuit switched gateway 2812 can authorize and authenticate traffic (e.g., voice) arising from such networks. Additionally, CS gateway 2812 can access mobility, or roaming, data generated through SS7 network 2860; for instance, mobility data stored in a VLR, which can reside in memory 2830. Moreover, CS gateway node(s) 2812 interfaces CS-based traffic and signaling and gateway node(s) 2818. As an example, in a 3GPP UMTS network, PS gateway node(s) 2818 can be embodied in gateway GPRS support node(s) (GGSN).

In addition to receiving and processing CS-switched traffic and signaling, PS gateway node(s) 2818 can authorize and authenticate PS-based data sessions with served (e.g., through macro RAN) wireless devices. Data sessions can include traffic exchange with networks external to the macro network platform 2810, like wide area network(s) (WANs) 2850, enterprise networks (NW(s)) 2870 (e.g., enhanced 911), or service NW(s) 2890 like IP multimedia subsystem (IMS); it should be appreciated that local area network(s) (LANs), which may be a part of enterprise NW(s), can also be interfaced with macro network platform 2810 through PS gateway node(s) 2818. Packet-switched gateway node(s) 2818 generates packet data contexts when a data session is established. To that end, in an aspect, PS gateway node(s) 2818 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s)

2814. It is to be noted that in 3GPP UMTS network(s), PS gateway node(s) 2818 (e.g., GGSN) and tunnel interface (e.g., TTG) comprise a packet data gateway (PDG).

Macro network platform 2810 also includes serving node(s) 2816 that convey the various packetized flows of information, or data streams, received through PS gateway node(s) 2818. As an example, in a 3GPP UMTS network, serving node(s) can be embodied in serving GPRS support node(s) (SGSN).

As indicated above, server(s) 2814 in macro network platform 2810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 2810. Data streams can be conveyed to PS gateway node(s) 2818 for authorization/authentication and initiation of a data session, and to serving node(s) 2816 for communication thereafter. Server(s) 2814 can also effect security (e.g., implement one or more firewalls) of macro network platform 2810 to ensure network's operation and data integrity in addition to authorization and authentication procedures that CS gateway node(s) 2812 and PS gateway node(s) 2818 can enact. Moreover, server(s) 2814 can provision services from external network(s), e.g., WAN 2850, or Global Positioning System (GPS) network(s), which can be a part of enterprise NW(s) 2880. It is to be noted that server(s) 2814 can include one or more processor configured to provide at least in part the functionality of macro network platform 2810. To that end, the one or more processor can execute code instructions stored in memory 2830, for example.

In example wireless environment 2800, memory 2830 stores information related to operation of macro network platform 2810. Information can include business data associated with subscribers; market plans and strategies, e.g., promotional campaigns, business partnerships; operational data for mobile devices served through macro network platform; service and privacy policies; end-user service logs for law enforcement; and so forth. Memory 2830 can also store information from at least one of telephony network(s) 2840, WAN 2850, SS7 network 2860, enterprise NW(s) 2870, or service NW(s) 2880.

Regarding femto network platform 2880, it includes a femto gateway node(s) 2884, which have substantially the same functionality as PS gateway node(s) 2818. Additionally, femto gateway node(s) 2884 can also include substantially all functionality of serving node(s) 2816. Disparate gateway node(s) 2884 can control or operate disparate sets of deployed femto APs, which can be a part of femto RAN 2890. In an aspect of the subject innovation, femto gateway node(s) 2884 can operate in substantially the same manner as gateway node 420. Femto network platform 2880 also includes clock layer (s) 2820, which can include the clock strata of network time protocol (NTP) and thus supply various time-based utilities.

Memory 2886 can retain additional information relevant to operation of the various components of femto network platform 2880. For example operational information that can be stored in memory 2886 can comprise, but is not limited to, subscriber intelligence; contracted services; maintenance and service records; femtocell configuration (e.g., devices served through femto RAN 2890; authorized subscribers associated with one or more deployed femto APs); service policies and specifications; privacy policies; add-on features; so forth.

Server(s) 2882 have substantially the same functionality as described in connection with server(s) 2814. In an aspect, server(s) 2882 can execute multiple application(s) that provide service (e.g., voice and data) to wireless devices served through femto RAN 2890. Server(s) 2882 can also provide security features to femto network platform. In addition, server(s) 2882 can manage (e.g., schedule, queue, format . . . ) substantially all packetized flows (e.g., IP-based, frame relay-based, ATM-based) it generates in addition to data received from macro network platform 2810. Furthermore, server(s) 2882 can effect provisioning of femtocell service, and effect operations and maintenance. It is to be noted that server(s) 2882 can include one or more processors configured to provide at least in part the functionality of femto network platform 2880. To that end, the one or more processors can execute code instructions stored in memory 2886, for example.

Figure 29:
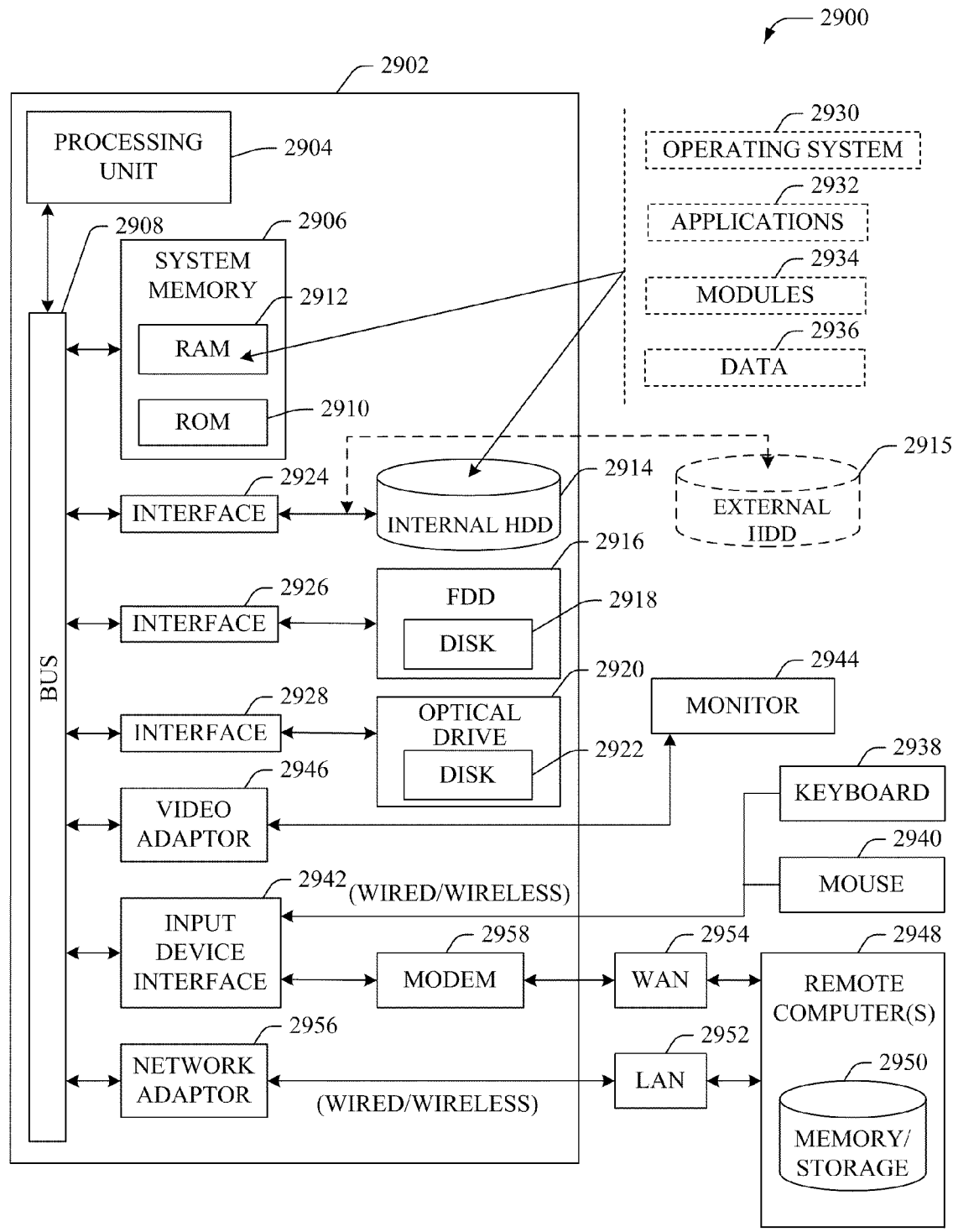
FIG. 29 illustrates a suitable computing environment in which various aspects of the subject innovation can be implemented and that can embody one or more of the components described herein.

In order to provide additional context for various aspects of the subject specification, FIG. 29 and the following discussion are intended to provide a brief, general description of a suitable computing environment 2900 in which various aspects of the subject innovation can be implemented, and that can embody one or more of the components described herein (e.g., POL terminal, leasing component 110, promotional planning component, etc.). While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 29, the example environment 2900 for implementing various aspects of the specification includes a computer 2902, the computer 2902 including a processing unit 2904, a system memory 2906 and a system bus 2908. The system bus 2908 couples system components including, but not limited to, the system memory 2906 to the processing unit 2904. The processing unit 2904 can be any of various commercially available processors. Dual microprocessors and other multi-processor architectures may also be employed as the processing unit 2904.

The system bus 2908 can be any of several types of bus structure that may further interconnect to a memory bus (with or without a memory controller), a peripheral bus, and a local bus using any of a variety of commercially available bus architectures. The system memory 2906 includes read-only memory (ROM) 2910 and random access memory (RAM) 2912. A basic input/output system (BIOS) is stored in a non-volatile memory 2910 such as ROM, EPROM, EEPROM, which BIOS contains the basic routines that help to transfer information between elements within the computer 2902, such as during start-up. The RAM 2912 can also include a high-speed RAM such as static RAM for caching data.

The computer 2902 further includes an internal hard disk drive (HDD) 2914 (e.g., EIDE, SATA), which internal hard disk drive 2914 may also be configured for external use in a suitable chassis (not shown), or an external HDD 2915 can be present in addition to internal HDD 2914, a magnetic floppy disk drive (FDD) 2916, (e.g., to read from or write to a removable diskette 2918) and an optical disk drive 2920, (e.g., reading a CD-ROM disk 2922 or, to read from or write to other high capacity optical media such as the DVD). The hard disk drive 2914, magnetic disk drive 2916 and optical disk drive 2920 can be connected to the system bus 2908 by a hard disk drive interface 2924, a magnetic disk drive interface 2926 and an optical drive interface 2928, respectively. The interface 2924 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 2902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 2912, including an operating system 2930, one or more application programs 2932, other program modules 2934 and program data 2936. All or portions of the operating system, applications, modules, and/or data can also be cached in the RAM 2912. It is appreciated that the specification can be implemented with various commercially available operating systems or combinations of operating systems.

A user can enter commands and information into the computer 2902 through one or more wired/wireless input devices, e.g., a keyboard 2938 and a pointing device, such as a mouse 2940. Other input devices (not shown) may include a microphone, an IR remote control, a joystick, a game pad, a stylus pen, touch screen, or the like. These and other input devices are often connected to the processing unit 2904 through an input device interface 2942 that is coupled to the system bus 2908, but can be connected by other interfaces, such as a parallel port, an IEEE 1394 serial port, a game port, a USB port, an IR interface, etc.

A monitor 2944 or other type of display device is also connected to the system bus 2908 via an interface, such as a video adapter 2946. In addition to the monitor 2944, a computer typically includes other peripheral output devices (not shown), such as speakers, printers, etc.

The computer 2902 may operate in a networked environment using logical connections via wired and/or wireless communications to one or more remote computers, such as a remote computer(s) 2948. The remote computer(s) 2948 can be a workstation, a server computer, a router, a personal computer, portable computer, microprocessor-based entertainment appliance, a peer device or other common network node, and typically includes many or all of the elements described relative to the computer 2902, although, for purposes of brevity, only a memory/storage device 2950 is illustrated. The logical connections depicted include wired/wireless connectivity to a local area network (LAN) 2952 and/or larger networks, e.g., a wide area network (WAN) 2954. Such LAN and WAN networking environments are commonplace in offices and companies, and facilitate enterprise-wide computer networks, such as intranets, all of which may connect to a global communications network, e.g., the Internet.

When used in a LAN networking environment, the computer 2902 is connected to the local network 2952 through a wired and/or wireless communication network interface or adapter 2956. The adapter 2956 may facilitate wired or wireless communication to the LAN 2952, which may also include a wireless access point disposed thereon for communicating with the wireless adapter 2956.

When used in a WAN networking environment, the computer 2902 can include a modem 2958, or is connected to a communications server on the WAN 2954, or has other means for establishing communications over the WAN 2954, such as by way of the Internet. The modem 2958, which can be internal or external and a wired or wireless device, is connected to the system bus 2908 via the serial port interface 2942. In a networked environment, program modules depicted relative to the computer 2902, or portions thereof, can be stored in the remote memory/storage device 2950. It will be appreciated that the network connections shown are example and other means of establishing a communications link between the computers can be used.

The computer 2902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi, Bluetooth™ picocell, or femtocell wireless technologies. Thus, the communication can be a predefined structure as with a conventional network or simply an ad hoc communication between at least two devices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

It should be appreciated that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   receiving, by a system comprising at least one processor, an indication that an applicant is eligible to lease a device that accesses resources in a wireless network;
   configuring, by the system, a lease agreement associated with the device, in response to the receiving; and
   provisioning, by the system, a component, local to the device, that regulates the lease agreement, in response the lease agreement being executed by the applicant, wherein the provisioning includes:
      determining an applicant-specific operational profile, which includes a setting, associated with a function of the device, that is indicative of a preference of the applicant as a lessee;
      delivering the applicant-specific operational profile to the device;
      receiving, from a service node, an operational profile that is employed to augment the applicant-specific operational profile;
      delivering the augmented applicant-specific operational profile to the device; and
      synchronizing the augmented applicant-specific operational profile with a network external to the wireless network.

2. The method of claim 1, wherein the configuring includes composing the applicant-specific operational profile that specifies a default setting, in response to determining that the applicant is a new lessee.

3. The method of claim 1, wherein the configuring includes collecting the applicant-specific operational profile from a network data store, in response to determining that the applicant is a legacy lessee.

4. The method of claim 1, further comprising: updating, by the system, an account, wherein the updating includes recording of an updated applicant-specific operational profile, in response to determining that the lease agreement is a renewal agreement.

5. The method of claim 1, further comprising: determining, by the system, that the device is returned on expiration of the lease agreement.

6. The method of claim 4, further comprising: scheduling, by the system, the device for configuration for a new lease, in response to the determining.

7. The method of claim 1, further comprising:
determining, by the system, that the device is not returned on expiration of the lease agreement;
pursuing, by the system, asset protection, including polling location data associated with the device.

8. The method of claim 1, further comprising: configuring, by the system, a set of access lists to femtocell service, wherein the configuring act includes:
adding an identifier associated with the device to a first subset of the set of access lists; and
recording addition of the identifier to a second subset of the set of access lists.

9. The method of claim 8, wherein, the configuring includes removing the identifier of the device from the first and second subsets, in response to detecting that the lease agreement is terminated and that the lease agreement is not renewed.

10. The method of claim 1, further comprising: generating, by the system, a subscriber-specific lease plan for the device.

11. The method of claim 1, further comprising:
issuing, by the system, a customized leasing incentive for the device;
conveying, by the system, the leasing incentive; and
updating, by the system, the lease agreement based on at least a portion of the leasing incentive.

12. A system, comprising:
at least one processor that facilitates execution of computer executable components stored on at least one non-transitory computer readable storage medium, the computer executable components, comprising:
a registration component that generates a lease agreement for a device, the registration component creates a service unit bank retained in a memory, based on the lease agreement;
a billing component that updates the service unit bank and determines consumption of a leased service unit;
a profile management component that composes a lessee-specific operational profile that includes a setting associated with a function of the device that is indicative of a lessee preference, wherein the registration component delivers the lessee-specific operational profile to the device;
a synchronization component that retrieves, from a service node, an operational profile that is employed to augment the lessee-specific operational profile, wherein the registration component delivers the augmented lessee-specific operational profile to the device and wherein the synchronization component synchronizes the augmented lessee-specific operational profile with a network external to a wireless network to which the device is connected; and
a component that delivers, to the device, an indication that the lease agreement is active.

13. The system of claim 12, wherein the registration component delivers the augmented lessee-specific operational profile to the device via a femtocell network.

14. The system of claim 12, wherein the synchronization component synchronizes the augmented lessee-specific operational profile in response to receipt of a notification indicative of an update associated with a service provided by the external network.

15. The system of claim 13, further comprising: a tracking component that polls location data associated with the device, in response to the device being unreturned after a predetermined period subsequent to expiration of the lease agreement.

16. The system of claim 12, wherein the billing component assesses lease agreement charges and brokers a financial hold on a lessee's financial instrument, the financial hold is directed to guarantee receipt of a monetary resource to cover a cost associated with replacement of the device.

17. The system of claim 12, wherein the registration component receives an indication that the device has been returned and schedules the device to be commissioned for a new lease agreement, wherein user-related data is deleted from the device, in response to the device being commissioned.

18. The system of claim 12, further comprising: a component that configures an access list to femtocell service, based on the lease agreement.

19. The system of claim 12, further comprising:
a first component that generates a subscriber-specific leasing plan; and
a second component that establishes a leasing incentive based at least in part on lessee-related data, wherein the leasing incentive includes a bonus service unit.

20. A method, comprising:
receiving, by a system comprising at least one processor, an indication of an active lease for a device;
configuring, by the system, a repository of a service unit in accordance with a lease term within a lease agreement associated with the active lease;
provisioning, by the system, a lessee-specific operational profile, for the device, that specifies a parameter, associated with a function of the device, which is indicative of a lessee preference;
receiving, an operational profile, from a service node, that is employed to augment the lessee-specific operational profile;
synchronizing the augmented lessee-specific operational profile with a network external to a wireless network to which the device is connected; and
monitoring utilization of the device.

21. The method of claim 20, further comprising: effecting, by the system, a lease renewal procedure, in response to expiration of the lease agreement, including:
locking at least part of a functionality of the device;
rendering an environment to renew the lease agreement; and
unlocking at least the part of the functionality of the device, in response to detecting that the lease agreement is renewed.

22. The method of claim 20, wherein the provisioning, by the system, includes:
receiving an indication that the lessee-specific operational profile is available;
downloading the lessee-specific operational profile; and
committing the lessee-specific operational profile.

23. The method of claim 20, wherein the provisioning, by the system, includes:
receiving a request to select the lessee-specific operational profile from a set of operational profiles associated with a lessee;
collecting a selection indication of the lessee-specific operational profile;
delivering the selection indication;
receiving the lessee-specific operational profile, in response to the delivering; and
committing the lessee-specific operational profile.

24. The method of claim 20, further comprising:
updating the lessee-specific operational profile; and in response to the updating, synchronizing the lessee-specific operational profile with the wireless network, wherein the synchronizing the lessee-specific operational profile includes communicating via a femtocell network.

25. The method of 24, wherein the synchronizing the lessee-specific operational profile comprises:
attaching to a femtocell access point associated with a device rental service; and
delivering the updated provisioned lessee-specific profile to the wireless network via the femtocell access point.

26. A device, comprising:
at least one processor that facilitates execution of computer executable components stored on at least one non-transitory computer readable storage medium, the computer executable components, comprising:
a communication platform that receives leasing configuration information associated with a lease agreement of the device, wherein the leasing configuration information includes a lessee-specific operational profile that specifies a parameter, indicative of a lessee preference, that is associated with a functionality of the device;
a leasing client component that generates a service unit bank in accordance with the lease agreement; and
a profile manager component that provisions the lessee-specific operational profile,
wherein the communication platform receives, from a service node, an operational profile that is employed to augment the lessee-specific operational profile, and wherein the augmented lessee-specific operational profile is synchronized with a network external to a wireless network to which the device is connected.

27. The device of claim 26, wherein leasing client component monitors utilization of network service based on the lease agreement and updates the service unit bank in accordance with the utilization.

28. The device of claim 27, wherein the leasing client component terminates the lease agreement and locks at least a portion of the functionality of the device, in response to the service unit bank being exhausted.

29. The device of claim 28, wherein the leasing client component supplies an environment to renew the lease agreement.

30. The device of claim 29, wherein the leasing client component receives a request to identify a location of the device, and transmits the location to a communication network, to which the device is connected.

31. The device of claim 20, wherein the leasing client component generates the location based at least in part on global positioning system data.

32. The device of claim 26, wherein the leasing configuration information further includes lease initiation data.

33. The device of claim 26, wherein the profile manager component enables manipulation of the lessee-specific operational profile.

34. The device of claim 26, wherein the profile manager component updates the lessee-specific operational profile, based at least in part on a feature of the lessee-specific operational profile, and delivers the lessee-specific operational profile to a network node via a femtocell network.

35. A non-transitory computer-readable storage medium having instructions stored thereon that, in response to execution, cause a system to perform operations, comprising:
receiving an indication of an active lease of a device that accesses a resource in a wireless network under a lease agreement;
configuring a lease timer in accordance with the lease agreement;
provisioning, for the device, a lessee-specific operational profile that includes a setting that is indicative of a lessee preference associated with a functionality of the device;
receiving, an operational profile, from a service node, that is employed to augment the lessee-specific operational profile;
synchronizing the augmented lessee-specific operational profile with a network external to the wireless network; and
monitoring utilization of the device in accordance with the lease agreement.

36. The non-transitory computer-readable storage medium of claim 35, wherein the operations further comprise:
locking at least part of a functionality of the device, in response to expiration of the lease timer;
rendering an environment to renew the lease agreement; and
unlocking at least the part of the functionality of the device, in response to receiving a notification indicative of renewal of the lease agreement.

* * * * *